US008270439B2

(12) United States Patent
Herr et al.

(10) Patent No.: US 8,270,439 B2
(45) Date of Patent: Sep. 18, 2012

(54) VIDEO GAME SYSTEM USING PRE-ENCODED DIGITAL AUDIO MIXING

(75) Inventors: Stefan Herr, Dierbach (DE); Ulrich Sigmund, Waldkirch (DE)

(73) Assignee: Activevideo Networks, Inc., San Jose, CA (US)

(*) Notice: Subject to any disclaimer, the term of this patent is extended or adjusted under 35 U.S.C. 154(b) by 1016 days.

(21) Appl. No.: 11/620,593

(22) Filed: Jan. 5, 2007

(65) Prior Publication Data

US 2007/0105631 A1 May 10, 2007

Related U.S. Application Data

(63) Continuation-in-part of application No. 11/178,189, filed on Jul. 8, 2005.

(51) Int. Cl.
*H04J 3/02* (2006.01)

(52) U.S. Cl. ........................................................ 370/537

(58) Field of Classification Search .................... 463/42; 370/395.21, 395.42, 395.43, 474, 537–541
See application file for complete search history.

(56) References Cited

U.S. PATENT DOCUMENTS 5,471,263 A * 11/1995 Odaka ............................ 352/27
RE35,314 E 8/1996 Logg ................................ 463/2
5,570,363 A * 10/1996 Holm ............................ 370/260
5,581,653 A * 12/1996 Todd ............................ 704/229
5,596,693 A 1/1997 Needle et al. ................. 395/174
5,617,145 A * 4/1997 Huang et al. ............... 348/423.1
5,630,757 A 5/1997 Gagin et al. .................... 463/43
5,632,003 A * 5/1997 Davidson et al. .......... 704/200.1
5,864,820 A 1/1999 Case ............................. 704/278
5,946,352 A * 8/1999 Rowlands et al. ............ 375/242
5,978,756 A * 11/1999 Walker et al. ................. 704/210
5,995,146 A 11/1999 Rasmussen ................... 348/385
6,014,416 A 1/2000 Shin et al. ..................... 375/368
6,021,386 A * 2/2000 Davis et al. ................... 704/229

(Continued)

FOREIGN PATENT DOCUMENTS

CA 2163500 A1 5/1996

(Continued)

OTHER PUBLICATIONS

AC-3 Digital Audio Compression Standard Dec. 20, 1995 Extract.*

(Continued)

*Primary Examiner* — Kwang B Yao
*Assistant Examiner* — Jung-Jen Liu
(74) *Attorney, Agent, or Firm* — Morgan, Lewis & Bockius LLP

(57) ABSTRACT

A method and related system of encoding audio is disclosed. In the method, data representing a plurality of independent audio signals is accessed. The data representing each respective audio signal comprises a sequence of source frames. Each frame in the sequence of sources frames comprises a plurality of audio data copies. Each audio data copy has an associated quality level that is a member of a predefined range of quality levels, ranging from a highest quality level to a lowest quality level. The plurality of source frame sequences is merged into a sequence of target frames that comprise a plurality of target channels. Merging corresponding source frames into a respective target frame includes selecting a quality level and assigning the audio data copy at the selected quality level of each corresponding source frame to at least one respective target channel.

36 Claims, 18 Drawing Sheets

U.S. PATENT DOCUMENTS

| | | | | |
|---|---|---|---|---|
| 6,078,328 | A | 6/2000 | Schumann et al. | 345/418 |
| 6,084,908 | A | 7/2000 | Chiang et al. | 375/240 |
| 6,108,625 | A * | 8/2000 | Kim | 704/229 |
| 6,141,645 | A * | 10/2000 | Chi-Min et al. | 704/500 |
| 6,192,081 | B1 | 2/2001 | Chiang et al. | 375/240.16 |
| 6,205,582 | B1 | 3/2001 | Hoarty | 725/93 |
| 6,226,041 | B1 | 5/2001 | Florencio et al. | 348/473 |
| 6,236,730 | B1 | 5/2001 | Cowieson et al. | 381/18 |
| 6,243,418 | B1 | 6/2001 | Kim | 375/240.12 |
| 6,253,238 | B1 | 6/2001 | Lauder et al. | 709/217 |
| 6,292,194 | B1 | 9/2001 | Powell, III | 345/430 |
| 6,305,020 | B1 | 10/2001 | Hoarty et al. | 725/95 |
| 6,317,151 | B1 | 11/2001 | Ohsuga et al. | 348/36 |
| 6,349,284 | B1 * | 2/2002 | Park et al. | 704/500 |
| 6,446,037 | B1 * | 9/2002 | Fielder et al. | 704/229 |
| 6,481,012 | B1 | 11/2002 | Gordon et al. | 725/54 |
| 6,536,043 | B1 * | 3/2003 | Guedalia | 725/90 |
| 6,557,041 | B2 | 4/2003 | Mallart | 709/231 |
| 6,560,496 | B1 | 5/2003 | Michener | 700/94 |
| 6,579,184 | B1 | 6/2003 | Tanskanen | 463/41 |
| 6,614,442 | B1 | 9/2003 | Ouyang et al. | 345/545 |
| 6,625,574 | B1 | 9/2003 | Taniguchi et al. | |
| 6,675,387 | B1 | 1/2004 | Boucher et al. | 725/105 |
| 6,687,663 | B1 | 2/2004 | McGrath et al. | 704/200.1 |
| 6,754,271 | B1 | 6/2004 | Gordon et al. | 375/240.12 |
| 6,758,540 | B1 | 7/2004 | Adolph et al. | 375/240.26 |
| 6,766,407 | B1 * | 7/2004 | Lisitsa et al. | 710/316 |
| 6,807,528 | B1 * | 10/2004 | Truman et al. | 704/229 |
| 6,810,528 | B1 | 10/2004 | Chatani | 725/109 |
| 6,817,947 | B2 | 11/2004 | Tanskanen | 463/41 |
| 6,931,291 | B1 * | 8/2005 | Alvarez-Tinoco et al. | 700/94 |
| 6,952,221 | B1 | 10/2005 | Holtz et al. | |
| 7,272,556 | B1 * | 9/2007 | Aguilar et al. | 704/230 |
| 7,742,609 | B2 | 6/2010 | Yeajel et al. | |
| 7,751,572 | B2 | 7/2010 | Villemoes et al. | |
| 2001/0049301 | A1 | 12/2001 | Masuda et al. | 463/33 |
| 2002/0016161 | A1 * | 2/2002 | Dellien et al. | 455/403 |
| 2002/0175931 | A1 | 11/2002 | Holtz et al. | |
| 2003/0027517 | A1 | 2/2003 | Callway et al. | 455/3.01 |
| 2003/0038893 | A1 * | 2/2003 | Rajamaki et al. | 348/553 |
| 2003/0058941 | A1 | 3/2003 | Chen et al. | 375/240.12 |
| 2003/0088328 | A1 | 5/2003 | Nishio | |
| 2003/0088400 | A1 | 5/2003 | Nishio | |
| 2003/0122836 | A1 | 7/2003 | Doyle et al. | 345/559 |
| 2003/0189980 | A1 | 10/2003 | Dvir et al. | 375/240.16 |
| 2003/0229719 | A1 | 12/2003 | Iwata et al. | 709/247 |
| 2004/0139158 | A1 | 7/2004 | Datta | 709/205 |
| 2004/0157662 | A1 | 8/2004 | Tsuchiya | 463/32 |
| 2004/0184542 | A1 | 9/2004 | Fujimoto | 375/240.16 |
| 2004/0261114 | A1 | 12/2004 | Addington et al. | 725/106 |
| 2005/0015259 | A1 * | 1/2005 | Thumpudi et al. | 704/500 |
| 2005/0044575 | A1 | 2/2005 | Der Kuyl | 725/100 |
| 2005/0089091 | A1 | 4/2005 | Kim et al. | 375/240.01 |
| 2005/0226426 | A1 * | 10/2005 | Oomen et al. | 381/23 |
| 2006/0269086 | A1 | 11/2006 | Page et al. | |
| 2008/0154583 | A1 | 6/2008 | Goto et al. | |
| 2008/0253440 | A1 * | 10/2008 | Srinivasan et al. | 375/240 |
| 2009/0144781 | A1 * | 6/2009 | Glaser et al. | 725/89 |
| 2011/0002470 | A1 * | 1/2011 | Purnhagen et al. | 381/23 |
| 2011/0035227 | A1 | 2/2011 | Lee et al. | |

FOREIGN PATENT DOCUMENTS

| | | | |
|---|---|---|---|
| EP | 0714684 | A1 | 6/1996 |
| EP | 1428562 | A2 | 6/2004 |
| FR | 2891098 | A1 | 3/2007 |
| GB | 2378345 | A | 2/2003 |
| WO | WO 99/00735 | A1 | 1/1999 |
| WO | WO 99/65232 | A1 | 12/1999 |
| WO | WO 01/41447 | A1 | 6/2001 |
| WO | WO 03/047710 | A2 | 6/2003 |
| WO | WO 2004/018060 | A2 | 3/2004 |
| WO | WO 2006/014362 | A1 | 2/2006 |
| WO | WO 2006/110268 | A1 | 10/2006 |

OTHER PUBLICATIONS

AC-3 Digital Audio Compression Standard Dec 20, 1995 Extract.*

Vernon, Dolby Digital: Audio Coding for Digital Television and Storage Applications. 1999.*

Broadhead, M.A., et al., "Direct Manipulation of MPEG Compressed Digital Audio," ACM Multimedia 95—Electronic Proceedings, Nov. 5-9, 1995, San Francisco, California.

Todd, C.C., et al., "AC-3: Flexible Perceptual Coding for Audio Transmission and Storage," 96$^{th}$ Conv. Aud. Eng. Soc., Feb. 1994.

Vernon, S., "Dolby Digital: Audio Coding for Digital Television and Storage Applications," AES 17$^{th}$ Int'l Conf. on High Quality Audio Coding, Aug. 1999.

Advanced Television Systems Committee Inc, "Digital Audio Compression Standard (AC-3, E-AC-3) Revision B", Document A52B, Jun. 14, 2005, pp. 1-236.

Benjelloun, *A summation algorithm for MPEG-1 coded audio signals: a first step towards audio processing in the compressed domain*, Ann. Telecomun, 55(3-4), 2000, pp. 108-116.

*CD 11172-3 Coding of Moving Pictures and Associated Audio for Digital Storage Media at up to about 1.5 MBIT/s Part 3 Audio*, Jan. 1, 1992, 173 pgs.

*FFMPEG-0.4.9 Audio Layer 2 Tables* including *Fixed Psycho Acoustic Model*, ffmpeg-0.4.9-prel/Libavcodec/mpegaudiotab.h, 2001, 2 pgs.

*FFMPEG*, http://www.ffmpeg.org, downloaded Apr. 8, 2010, 8 pages.

International Preliminary Report on Patentability, PCT/US2008/050221, Jul. 7, 2009, 6 pages.

International Search Report/Written Opinion, PCT/US2006/010080, Jun. 20, 2006, 8 pages.

International Search Report/Written Opinion, PCT/US2006/024195, Nov. 29, 2006, 9 pages.

International Search Report/Written Opinion, PCT/US2006/024196, Dec. 11, 2006, 9 pages.

International Search Report/Written Opinion, PCT/US2010/041133, Oct. 19, 2010, 13 pages.

International Search Report/Written Opinion, PCT/US2008/050221, Jun. 12, 2008, 9 pages.

Office Action, U.S. Appl. No. 11/103,838, Aug. 19, 2008, 17 pages.

Final Office Action, U.S. Appl. No. 11/103,838, Feb. 5, 2009, 30 pages.

Office Action, U.S. Appl. No. 11/103,838, May 12, 2009, 32 pages.

Final Office Action, U.S. Appl. No. 11/103,838, Nov. 19, 2009, 34 pages.

Office Action, U.S. Appl. No. 11/178,177, Mar. 29, 2010, 11 pages.

Office Action, U.S. Appl. No. 11/178,182, Feb. 23, 2010, 15 pages.

Office Action, U.S. Appl. No. 11/178,183, Feb. 19, 2010, 18 pages.

Office Action, U.S. Appl. No. 11/178,189, Jul. 23, 2009, 10 pages.

Final Office Action, U.S. Appl. No. 11/178,189, Mar. 15, 2010, 11 pages.

*SAOC Use cases, draft requirements and architecture*, ISO/EIC JTC1/SC29/WG11, Hangzhou, China, Oct. 2006, 16 pages.

The Toolame Project, Psycho_nl.c, 1999, 1 pg.

Tudor, *MPEG-2 Video Compression*, Electronics & Communication Engineering Journal, Dec. 1995, 15 pgs.

Wang, *A Beat-Pattern based Error Concealment Scheme for Music Delivery with Burst Packet Loss*, ICME2001, CD-ROM proceeding, Tokyo, Japan, Aug. 22-25, 2001, 4 pgs.

Wang, *A Compressed Domain Beat Detector using MP3 Audio Bitstream*, ACM Multimedia 2001, Ottawa, Ontario, Canada, Sep. 30-Oct. 5, 2001, 9 pages.

Wang, *A Multichannel Audio Coding Algorithm for Inter-Channel Redundancy Removal*, AES110th International Convention, Amsterdam, The Netherlands, May 12-15, 2001, pp. 1-6.

Wang, *An Excitation Level Based Psychoacoustic Model for Audio Compression*, The 7th ACM International Multimedia Conference, Orlando, FL, Oct. 30-Nov. 4, 1999, 4 pages.

Wang, *Energy Compaction Property of the MDCT in Comparison with other Transforms*, AES109th International Convention, Los Angeles, CA, Sep. 22-25, 2000, pp. 1-23.

Wang, *Exploiting Excess Masking for Audio Compression*, AES 17th International Conference on High Quality Audio Coding, Florence, Italy, Sep. 2-5, 1999, pp. 1-4.

Wang, *Schemes for Re-Compressing MP3 Audio Bitstreams*, AES 111th International Convention, New York, NY, Nov. 30-Dec. 3, 2001, pp. 1-5.
Wang, Selected Advances in Audio Compression and Compressed Domain Processing, Tampere, Finland, Aug. 2001, pp. 1-68.
Wang, *The Impact of the Relationship Between MDCT and DFT on Audio Compression: A Step Towards Solving the Mismatch*, IEEE-PCM2000, Sydney, Australia, Dec. 13-15, 2000, pp. 1-9.
Herre, Thoughts on an SAOC Architecture, ISO/IEC JTC1/SC29/WG11, MPEG2006/M 13935, Hangzhou, China, Oct. 2006, 9 pgs.
Herr, Notice of Allowance, U.S. Appl. No. 12/534,016, Sep. 28, 2011, 13 pgs.
TAG Networks Inc., Office Action, Chinese Patent Application 200880001325.4, Jun. 22, 2011, 4 pgs.

* cited by examiner

400

Bit Allocation Pointer Table 1500

| Address | BAP |
|---|---|
| 0 | 0 |
| 1 | 1 |
| 2 | 1 |
| 3 | 1 |
| 4 | 1 |
| 5 | 1 |
| 6 | 2 |
| 7 | 2 |
| 8 | 3 |
| 9 | 3 |
| 10 | 3 |
| 11 | 4 |
| 12 | 4 |
| 13 | 5 |
| 14 | 5 |
| 15 | 6 |
| 16 | 6 |

VIDEO GAME SYSTEM USING PRE-ENCODED DIGITAL AUDIO MIXING

RELATED APPLICATIONS

This application is a continuation-in-part of U.S. patent application Ser. No. 11/178,189, filed Jul. 8, 2005, entitled "Video Game System Using Pre-Encoded Macro Blocks," which application is incorporated by reference herein in its entirety.

FIELD OF THE INVENTION

The present invention relates generally to an interactive video-game system, and more specifically to an interactive video-game system using mixing of digital audio signals encoded prior to execution of the video game.

BACKGROUND

Video games are a popular form of entertainment. Multi-player games, where two or more individuals play simultaneously in a common simulated environment, are becoming increasingly common, especially as more users are able to interact with one another using networks such as the World Wide Web (WWW), which is also referred to as the Internet. Single-player games also may be implemented in a networked environment. Implementing video games in a networked environment poses challenges with regard to audio playback.

In some video games implemented in a networked environment, a transient sound effect may be implemented by temporarily replacing background sound. Background sound, such as music, may be present during a plurality of frames of video over an extended time period. Transient sound effects may be present during one or more frames of video, but over a smaller time interval than the background sound. Through a process known as audio stitching, the background sound is not played when a transient sound effect is available. In general, audio stitching is a process of generating sequences of audio frames that were previously encoded off-line. A sequence of audio frames generated by audio stitching does not necessarily form a continuous stream of the same content. For example, a frame containing background sound can be followed immediately by a frame containing a sound effect. To smooth a transition from the transient sound effect back to the background sound, the background sound may be attenuated and the volume slowly increased over several frames of video during the transition. However, interruption of the background sound still is noticeable to users.

Accordingly, it is desirable to allow for simultaneous playback of sound effects and background sound, such that sound effects are played without interruption to the background sound. The sound effects and background sound may correspond to multiple pulse-code modulated (PCM) bitstreams. In a standard audio processing system, multiple PCM bitstreams may be mixed together and then encoded in a format such as the AC-3 format in real time. However, limitations on computational power may make this approach impractical when implementing multiple video games in a networked environment.

There is a need, therefore, for a system and method of merging audio data from multiple sources without performing real-time mixing of PCM bitstreams and real-time encoding of the resulting bitstream to compressed audio.

SUMMARY

A method of encoding audio is disclosed. In the method, data representing a plurality of independent audio signals is accessed. The data representing each respective audio signal comprises a sequence of source frames. Each frame in the sequence of sources frames comprises a plurality of audio data copies. Each audio data copy has an associated quality level that is a member of a predefined range of quality levels, ranging from a highest quality level to a lowest quality level. The plurality of source frame sequences is merged into a sequence of target frames that comprise a plurality of target channels. Merging corresponding source frames into a respective target frame includes selecting a quality level and assigning the audio data copy at the selected quality level of each corresponding source frame to at least one respective target channel.

Another aspect of a method of encoding audio is disclosed. In the method, audio data is received from a plurality of respective independent sources. The audio data from each respective independent source is encoded into a sequence of source frames, to produce a plurality of source frame sequences. The plurality of source frame sequences is merged into a sequence of target frames that comprise a plurality of independent target channels. Each source frame sequence is uniquely assigned to one or more target channels.

A method of playing audio in conjunction with a speaker system is disclosed. In the method, in response to a command, audio data is received comprising a sequence of frames that contain a plurality of channels wherein each channel either (A) corresponds solely to an independent audio source, or (B) corresponds solely to a unique channel in an independent audio source. If the number of speakers is less than the number of channels, two or more channels are down-mixed and their associated audio data is played on a single speaker. If the number of speakers is equal to or greater than the number of channels, the audio data associated with each channel is played on a corresponding speaker.

A system for encoding audio is disclosed, comprising memory, one or more processors, and one or more programs stored in the memory and configured for execution by the one or more processors. The one or more programs include instructions for accessing data representing a plurality of independent audio signals. The data representing each respective audio signal comprises a sequence of source frames. Each frame in the sequence of sources frames comprises a plurality of audio data copies. Each audio data copy has an associated quality level that is a member of a predefined range of quality levels, ranging from a highest quality level to a lowest quality level. The one or more programs also include instructions for merging the plurality of source frame sequences into a sequence of target frames that comprise a plurality of target channels. The instructions for merging include, for a respective target frame and corresponding source frames, instructions for selecting a quality level and instructions for assigning the audio data copy at the selected quality level of each corresponding source frame to at least one respective target channel.

Another aspect of a system for encoding audio is disclosed, comprising memory, one or more processors, and one or more programs stored in the memory and configured for execution by the one or more processors. The one or more programs include instructions for receiving audio data from a plurality of respective independent sources and instructions for encoding the audio data from each respective independent source into a sequence of source frames, to produce a plurality of source frame sequences. The one or more programs also include instructions for merging the plurality of source frame sequences into a sequence of target frames, wherein the target frames comprise a plurality of independent target channels and each source frame sequence is uniquely assigned to one or more target channels.

A system for playing audio in conjunction with a speaker system is disclosed, comprising memory, one or more processors, and one or more programs stored in the memory and configured for execution by the one or more processors. The one or more programs include instructions for receiving, in response to a command, audio data comprising a sequence of frames that contain a plurality of channels wherein each channel either (A) corresponds solely to an independent audio source, or (B) corresponds solely to a unique channel in an independent audio source. The one or more programs also include instructions for down-mixing two or more channels and playing the audio data associated with the two or more down-mixed channels on a single speaker if the number of speakers is less than the number of channels. The one or more programs further include instructions for playing the audio data associated with each channel on a corresponding speaker if the number of speakers is equal to or greater than the number of channels.

A computer program product for use in conjunction with audio encoding is disclosed. The computer program product comprises a computer readable storage medium and a computer program mechanism embedded therein. The computer program mechanism comprises instructions for accessing data representing a plurality of independent audio signals. The data representing each respective audio signal comprises a sequence of source frames. Each frame in the sequence of sources frames comprises a plurality of audio data copies. Each audio data copy has an associated quality level that is a member of a predefined range of quality levels, ranging from a highest quality level to a lowest quality level. The computer program mechanism also comprises instructions for merging the plurality of source frame sequences into a sequence of target frames that comprise a plurality of target channels. The instructions for merging include, for a respective target frame and corresponding source frames, instructions for selecting a quality level and instructions for assigning the audio data copy at the selected quality level of each corresponding source frame to at least one respective target channel.

Another aspect of a computer program product for use in conjunction with audio encoding is disclosed. The computer program product comprises a computer readable storage medium and a computer program mechanism embedded therein. The computer program mechanism comprises instructions for receiving audio data from a plurality of respective independent sources and instructions for encoding the audio data from each respective independent source into a sequence of source frames, to produce a plurality of source frame sequences. The computer program mechanism also comprises instructions for merging the plurality of source frame sequences into a sequence of target frames, wherein the target frames comprise a plurality of independent target channels and each source frame sequence is uniquely assigned to one or more target channels.

A computer program product for use in conjunction with playing audio on a speaker system is disclosed. The computer program product comprises a computer readable storage medium and a computer program mechanism embedded therein. The computer program mechanism comprises instructions for receiving, in response to a command, audio data comprising a sequence of frames containing a plurality of channels wherein each channel either (A) corresponds solely to an independent audio source, or (B) corresponds solely to a unique channel in an independent audio source. The computer program mechanism also comprises instructions for down-mixing two or more channels and playing the audio data associated with the two or more down-mixed channels on a single speaker if the number of speakers is less than the number of channels. The computer program mechanism further comprises instructions for playing the audio data associated with each channel on a corresponding speaker if the number of speakers is equal to or greater than the number of channels.

A system for encoding audio is disclosed. The system comprises means for accessing data representing a plurality of independent audio signals. The data representing each respective audio signal comprises a sequence of source frames. Each frame in the sequence of sources frames comprises a plurality of audio data copies. Each audio data copy has an associated quality level that is a member of a predefined range of quality levels, ranging from a highest quality level to a lowest quality level. The system also comprises means for merging the plurality of source frame sequences into a sequence of target frames that comprise a plurality of target channels. The means for merging include, for a respective target frame and corresponding source frames, means for selecting a quality level and means for assigning the audio data copy at the selected quality level of each corresponding source frame to at least one respective target channel.

Another aspect of a system for encoding audio is disclosed. The system comprises means for receiving audio data from a plurality of respective independent sources and means for encoding the audio data from each respective independent source into a sequence of source frames, to produce a plurality of source frame sequences. The system also comprises means for merging the plurality of source frame sequences into a sequence of target frames, wherein the target frames comprise a plurality of independent target channels and each source frame sequence is uniquely assigned to one or more target channels.

A system for playing audio in conjunction with a speaker system is disclosed. The system comprises means for receiving, in response to a command, audio data comprising a sequence of frames containing a plurality of channels wherein each channel either (A) corresponds solely to an independent audio source, or (B) corresponds solely to a unique channel in an independent audio source. The system also comprises means for down-mixing two or more channels and playing the audio data associated with the two or more down-mixed channels on a single speaker if the number of speakers is less than the number of channels. The system further comprises means for playing the audio data associated with each channel on a corresponding speaker if the number of speakers is equal to or greater than the number of channels.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
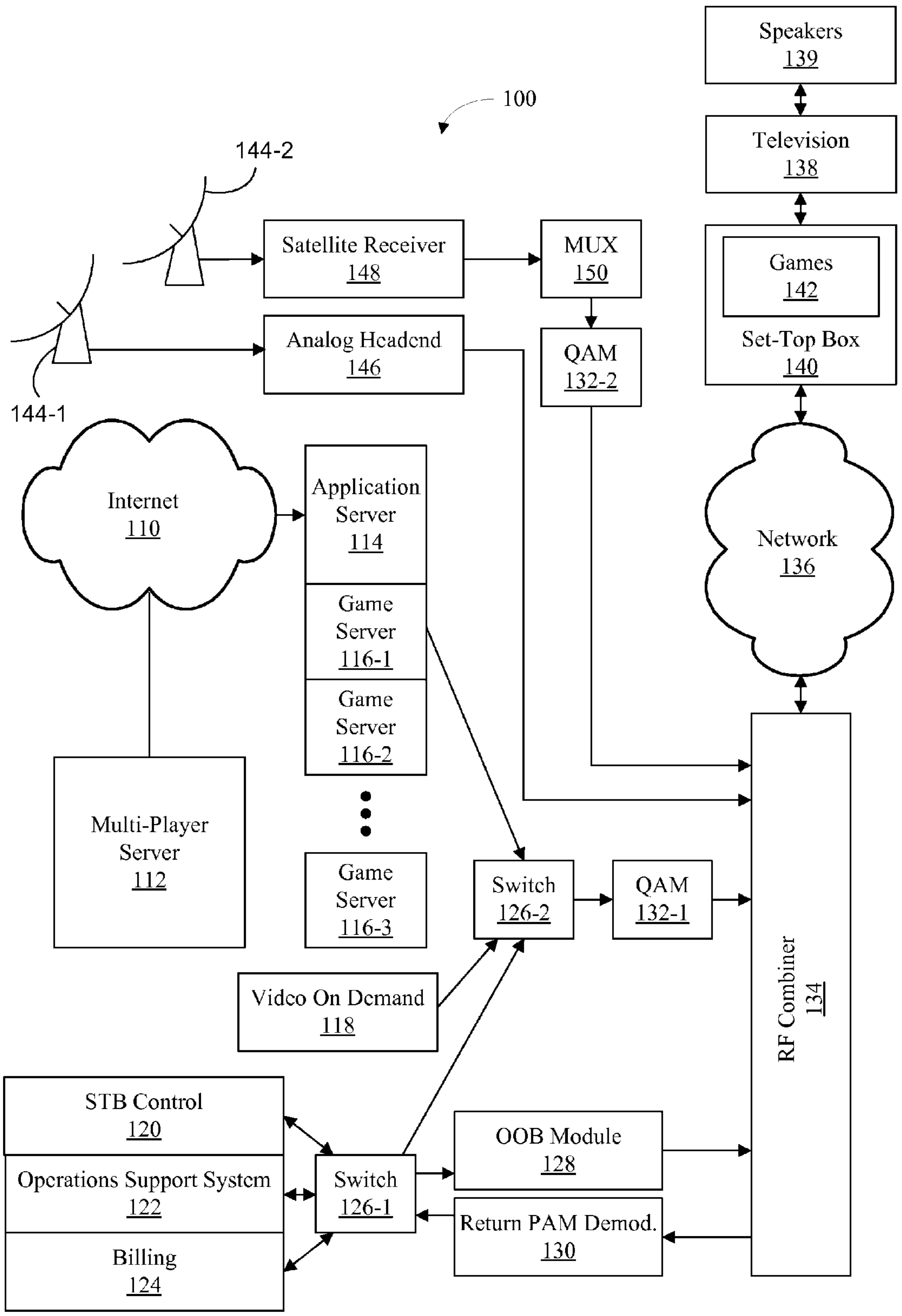
FIG. 1 is a block diagram illustrating an embodiment of a cable television system.

FIG. 1 is a block diagram illustrating an embodiment of a cable television system 100 for receiving orders for and providing content, such as one or more video games, to one or more users (including multi-user video games). Several content data streams may be transmitted to respective subscribers and respective subscribers may, in turn, order services or transmit user actions in a video game. Satellite signals, such as analog television signals, may be received using satellite antennas 144. Analog signals may be processed in analog headend 146, coupled to radio frequency (RF) combiner 134 and transmitted to a set-top box (STB) 140 via a network 136. In addition, signals may be processed in satellite receiver 148, coupled to multiplexer (MUX) 150, converted to a digital format using a quadrature amplitude modulator (QAM) 132-2 (such as 256-level QAM), coupled to the radio frequency (RF) combiner 134 and transmitted to the STB 140 via the network 136. Video on demand (VOD) server 118 may provide signals corresponding to an ordered movie to switch 126-2, which couples the signals to QAM 132-1 for conversion into the digital format. These digital signals are coupled to the radio frequency (RF) combiner 134 and transmitted to the STB 140 via the network 136.

The STB 140 may display one or more video signals, including those corresponding to video-game content discussed below, on television or other display device 138 and may play one or more audio signals, including those corresponding to video-game content discussed below, on speakers 139. Speakers 139 may be integrated into television 138 or may be separate from television 138. While FIG. 1 illustrates one subscriber STB 140, television or other display device 138, and speakers 139, in other embodiments there may be additional subscribers, each having one or more STBs, televisions or other display devices, and/or speakers.

The cable television system 100 may also include an application server 114 and a plurality of game servers 116. The application server 114 and the plurality of game servers 116 may be located at a cable television system headend. While a single instance or grouping of the application server 114 and the plurality of game servers 116 is illustrated in FIG. 1, other embodiments may include additional instances in one or more headends. The servers and/or other computers at the one or more headends may run an operating system such as Windows, Linux, Unix, or Solaris.

The application server 114 and one or more of the game servers 116 may provide video-game content corresponding to one or more video games ordered by one or more users. In the cable television system 100 there may be a many-to-one correspondence between respective users and an executed copy of one of the video games. The application server 114 may access and/or log game-related information in a database. The application server 114 may also be used for reporting and pricing. One or more game engines (also called game engine modules) 248 (FIG. 2) in the game servers 116 are designed to dynamically generate video-game content using pre-encoded video and/or audio data. In an exemplary embodiment, the game servers 116 use video encoding that is compatible with an MPEG compression standard and use audio encoding that is compatible with the AC-3 compression standard.

The video-game content is coupled to the switch 126-2 and converted to the digital format in the QAM 132-1. In an exemplary embodiment with 256-level QAM, a narrowcast sub-channel (having a bandwidth of approximately 6 MHz, which corresponds to approximately 38 Mbps of digital data) may be used to transmit 10 to 30 video-game data streams for a video game that utilizes between 1 and 4 Mbps.

These digital signals are coupled to the radio frequency (RF) combiner 134 and transmitted to STB 140 via the network 136. The application server 114 may also access, via Internet 110, persistent player or user data in a database stored in multi-player server 112. The application server 114 and the plurality of game servers 116 are further described below with reference to FIG. 2.

The STB 140 may optionally include a client application, such as games 142, that receives information corresponding to one or more user actions and transmits the information to one or more of the game servers 116. The game applications 142 may also store video-game content prior to updating a frame of video on the television 138 and playing an accompanying frame of audio on the speakers 139. The television 138 may be compatible with an NTSC format or a different format, such as PAL or SECAM. The STB 140 is described further below with reference to FIG. 3.

The cable television system 100 may also include STB control 120, operations support system 122 and billing system 124. The STB control 120 may process one or more user actions, such as those associated with a respective video game, that are received using an out-of-band (OOB) sub-channel using return pulse amplitude (PAM) demodulator 130 and switch 126-1. There may be more than one OOB sub-channel. While the bandwidth of the OOB sub-channel (s) may vary from one embodiment to another, in one embodiment, the bandwidth of each OOB sub-channel corresponds to a bit rate or data rate of approximately 1 Mbps. The operations support system 122 may process a subscriber's order for a respective service, such as the respective video game, and update the billing system 124. The STB control 120, the operations support system 122 and/or the billing system 124 may also communicate with the subscriber using the OOB sub-channel via the switch 126-1 and the OOB module 128, which converts signals to a format suitable for the OOB sub-channel. Alternatively, the operations support system 122 and/or the billing system 124 may communicate with the subscriber via another communications link such as an Internet connection or a communications link provided by a telephone system.

The various signals transmitted and received in the cable television system 100 may be communicated using packet-based data streams. In an exemplary embodiment, some of the packets may utilize an Internet protocol, such as User Datagram Protocol (UDP). In some embodiments, networks, such as the network 136, and coupling between components in the cable television system 100 may include one or more instances of a wireless area network, a local area network, a transmission line (such as a coaxial cable), a land line and/or an optical fiber. Some signals may be communicated using plain-old-telephone service (POTS) and/or digital telephone networks such as an Integrated Services Digital Network (ISDN). Wireless communication may include cellular telephone networks using an Advanced Mobile Phone System (AMPS), Global System for Mobile Communication (GSM), Code Division Multiple Access (CDMA) and/or Time Division Multiple Access (TDMA), as well as networks using an IEEE 802.11 communications protocol, also known as WiFi, and/or a Bluetooth communications protocol.

While FIG. 1 illustrates a cable television system, the system and methods described may be implemented in a satellite-based system, the Internet, a telephone system and/or a terrestrial television broadcast system. The cable television system 100 may include additional elements and/or remove one or more elements. In addition, two or more elements may be combined into a single element and/or a position of one or more elements in the cable television system 100 may be changed. In some embodiments, for example, the application server 114 and its functions may be merged with and into the game servers 116.

Figure 2:
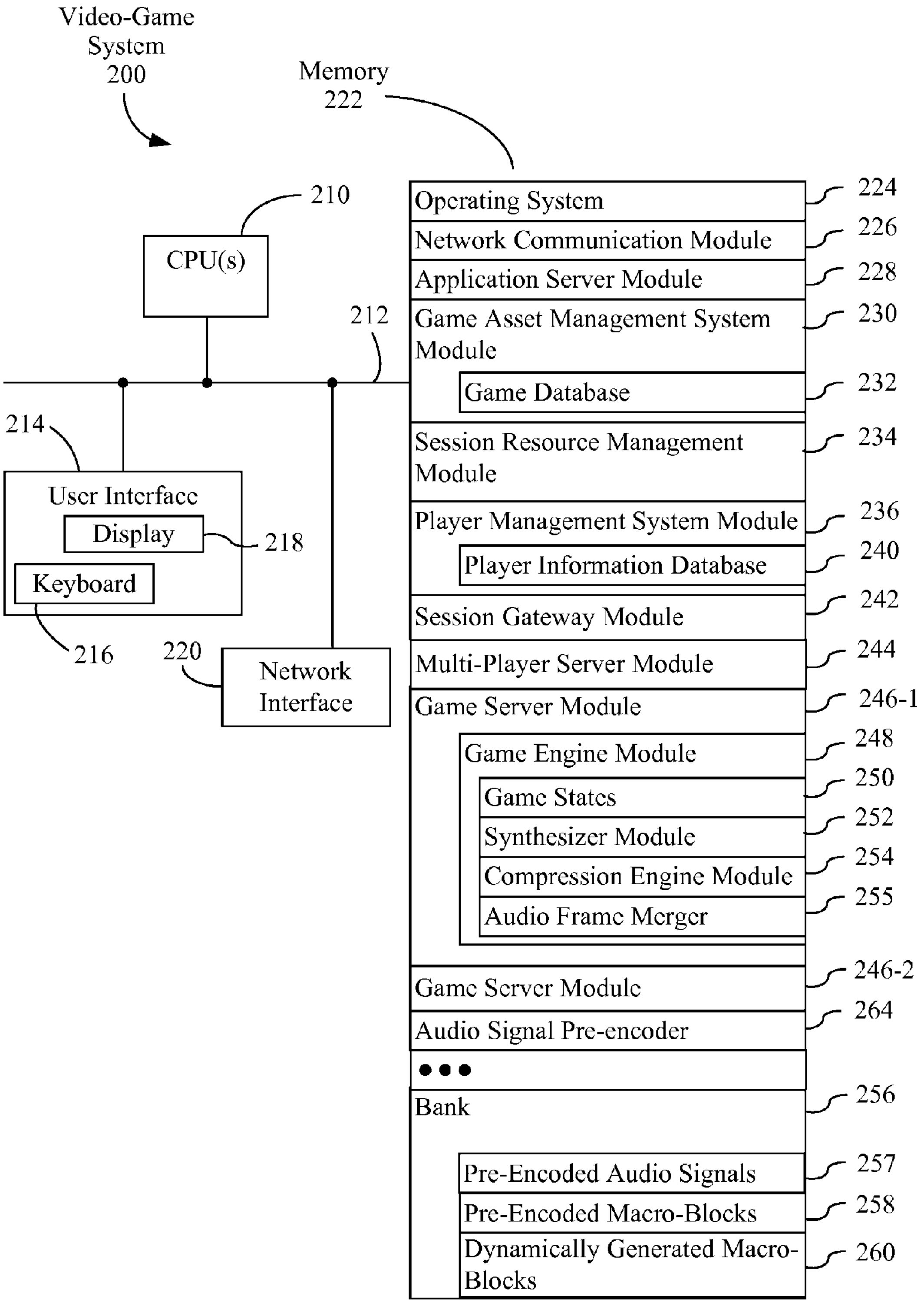
FIG. 2 is a block diagram illustrating an embodiment of a video-game system.

FIG. 2 is a block diagram illustrating an embodiment of a video-game system 200. The video-game system 200 may include at least one data processor, video processor and/or central processing unit (CPU) 210, one or more optional user interfaces 214, a communications or network interface 220 for communicating with other computers, servers and/or one or more STBs (such as the STB 140 in FIG. 1), memory 222 and one or more signal lines 212 for coupling these components to one another. The at least one data processor, video processor and/or central processing unit (CPU) 210 may be configured or configurable for multi-threaded or parallel processing. The user interface 214 may have one or more keyboards 216 and/or displays 218. The one or more signal lines 212 may constitute one or more communications busses.

Memory 222 may include high-speed random access memory and/or non-volatile memory, including ROM, RAM, EPROM, EEPROM, one or more flash disc drives, one or more optical disc drives and/or one or more magnetic disk storage devices. Memory 222 may store an operating system 224, such as LINUX, UNIX, Windows, or Solaris, that includes procedures (or a set of instructions) for handling basic system services and for performing hardware dependent tasks. Memory 222 may also store communication procedures (or a set of instructions) in a network communication module 226. The communication procedures are used for communicating with one or more STBs, such as the STB 140 (FIG. 1), and with other servers and computers in the video-game system 200.

Memory 222 may also include the following elements, or a subset or superset of such elements, including an applications server module 228 (or a set of instructions), a game asset management system module 230 (or a set of instructions), a session resource management module 234 (or a set of instructions), a player management system module 236 (or a set of instructions), a session gateway module 242 (or a set of instructions), a multi-player server module 244 (or a set of instructions), one or more game server modules 246 (or sets of instructions), an audio signal pre-encoder 264 (or a set of instructions), and a bank 256 for storing macro-blocks and pre-encoded audio signals. The game asset management system module 230 may include a game database 232, including pre-encoded macro-blocks, pre-encoded audio signals, and executable code corresponding to one or more video games. The player management system module 236 may include a player information database 240 including information such as a user's name, account information, transaction information, preferences for customizing display of video games on the user's STB(s) 140 (FIG. 1), high scores for the video games played, rankings and other skill level information for video games played, and/or a persistent saved game state for video games that have been paused and may resume later. Each instance of the game server module 246 may include one or more game engine modules 248. Game engine module 248 may include games states 250 corresponding to one or more sets of users playing one or more video games, synthesizer module 252, one or more compression engine modules 254, and audio frame merger 255. The bank 256 may include pre-encoded audio signals 257 corresponding to one or more video games, pre-encoded macro-blocks 258 corresponding to one or more video games, and/or dynamically generated or encoded macro-blocks 260 corresponding to one or more video games.

The game server modules 246 may run a browser application, such as Windows Explorer, Netscape Navigator or FireFox from Mozilla, to execute instructions corresponding to a respective video game. The browser application, however, may be configured to not render the video-game content in the game server modules 246. Rendering the video-game content may be unnecessary, since the content is not displayed by the game servers, and avoiding such rendering enables each game server to maintain many more game states than would otherwise be possible. The game server modules 246 may be executed by one or multiple processors. Video games may be executed in parallel by multiple processors. Games may also be implemented in parallel threads of a multi-threaded operating system.

Although FIG. 2 shows the video-game system 200 as a number of discrete items, FIG. 2 is intended more as a functional description of the various features which may be present in a video-game system rather than as a structural schematic of the embodiments described herein. In practice, and as recognized by those of ordinary skill in the art, the functions of the video-game system 200 may be distributed over a large number of servers or computers, with various groups of the servers performing particular subsets of those functions. Items shown separately in FIG. 2 could be combined and some items could be separated. For example, some items shown separately in FIG. 2 could be implemented on single servers and single items could be implemented by one or more servers. The actual number of servers in a video-game system and how features, such as the game server modules 246 and the game engine modules 248, are allocated among them will vary from one implementation to another, and may depend in part on the amount of information stored by the system and/or the amount of data traffic that the system must handle during peak usage periods as well as during average usage periods. In some embodiments, audio signal pre-encoder 264 is implemented on a separate computer system, which may be called a pre-encoding system, from the video game system(s) 200.

Furthermore, each of the above identified elements in memory 222 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 222 may store a subset of the modules and data structures identified above. Memory 222 also may store additional modules and data structures not described above.

Figure 3:
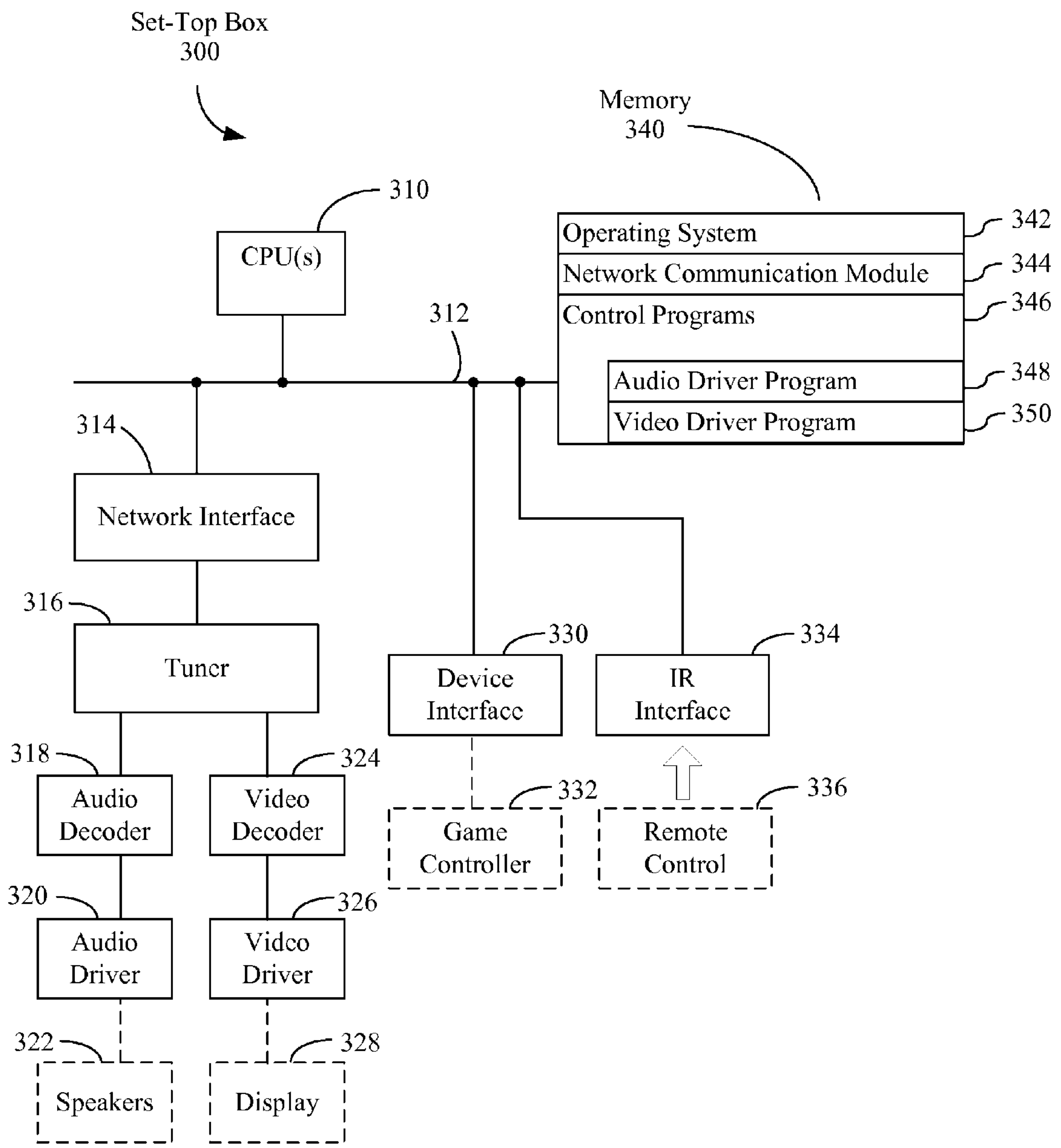
FIG. 3 is a block diagram illustrating an embodiment of a set top box.

FIG. 3 is a block diagram illustrating an embodiment of a set top box (STB) 300, such as STB 140 (FIG. 1). STB 300 may include at least one data processor, video processor and/or central processing unit (CPU) 310, a communications or network interface 314 for communicating with other computers and/or servers such as video game system 200 (FIG. 2), a tuner 316, an audio decoder 318, an audio driver 320 coupled to speakers 322, a video decoder 324, and a video driver 326 coupled to a display 328. STB 300 also may include one or more device interfaces 330, one or more IR interfaces 334, memory 340 and one or more signal lines 312 for coupling components to one another. The at least one data processor, video processor and/or central processing unit (CPU) 310 may be configured or configurable for multi-threaded or parallel processing. The one or more signal lines 312 may constitute one or more communications busses. The one or more device interfaces 330 may be coupled to one or more game controllers 332. The one or more IR interfaces 334 may use IR signals to communicate wirelessly with one or more remote controls 336.

Memory 340 may include high-speed random access memory and/or non-volatile memory, including ROM, RAM, EPROM, EEPROM, one or more flash disc drives, one or more optical disc drives, and/or one or more magnetic disk storage devices. Memory 340 may store an operating system 342 that includes procedures (or a set of instructions) for handling basic system services and for performing hardware dependent tasks. The operating system 342 may be an embedded operating system such as Linux, OS9 or Windows, or a real-time operating system suitable for use on industrial or commercial devices, such as VxWorks by Wind River Systems, Inc. Memory 340 may store communication procedures (or a set of instructions) in a network communication module 344. The communication procedures are used for communicating with computers and/or servers such as video game system 200 (FIG. 2). Memory 340 may also include control programs 346 (or a set of instructions), which may include an audio driver program 348 (or a set of instructions) and a video driver program 350 (or a set of instructions).

STB 300 transmits order information and information corresponding to user actions and receives video-game content via the network 136. Received signals are processed using network interface 314 to remove headers and other information in the data stream containing the video-game content. Tuner 316 selects frequencies corresponding to one or more sub-channels. The resulting audio signals are processed in audio decoder 318. In some embodiments, audio decoder 318 is an AC-3 decoder. The resulting video signals are processed in video decoder 324. In some embodiments, video decoder 314 is an MPEG-1, MPEG-2, MPEG-4, H.262, H.263, H.264, or VC-1 decoder; in other embodiments, video decoder 314 may be an MPEG-compatible decoder or a decoder for another video-compression standard. The video content output from the video decoder 314 is converted to an appropriate format for driving display 328 using video driver 326. Similarly, the audio content output from the audio decoder 318 is converted to an appropriate format for driving speakers 322 using audio driver 320. User commands or actions input to the game controller 332 and/or the remote control 336 are received by device interface 330 and/or by IR interface 334 and are forwarded to the network interface 314 for transmission.

The game controller 332 may be a dedicated video-game console, such as those provided by Sony Playstation®, Nintendo®, Sega® and Microsoft Xbox®, or a personal computer. The game controller 332 may receive information corresponding to one or more user actions from a game pad, keyboard, joystick, microphone, mouse, one or more remote controls, one or more additional game controllers or other user interface such as one including voice recognition technology. The display 328 may be a cathode ray tube, a liquid crystal display, or any other suitable display device in a television, a computer or a portable device, such as a video game controller 332 or a cellular telephone. In some embodiments, speakers 322 are embedded in the display 328. In some embodiments, speakers 322 include left and right speakers respectively positioned to the left and right of the displays 328. In some embodiments, in addition to left and right speakers, speakers 322 include a center speaker. In some embodiments, speakers 322 include surround-sound speakers positioned behind a user.

In some embodiments, the STB 300 may perform a smoothing operation on the received video-game content prior to displaying the video-game content. In some embodiments, received video-game content is decoded, displayed on the display 328, and played on the speakers 322 in real time as it is received. In other embodiments, the STB 300 stores the received video-game content until a full frame of video is received. The full frame of video is then decoded and displayed on the display 328 while accompanying audio is decoded and played on speakers 322.

Although FIG. 3 shows the STB 300 as a number of discrete items, FIG. 3 is intended more as a functional description of the various features which may be present in a set top box rather than as a structural schematic of the embodiments described herein. In practice, and as recognized by those of ordinary skill in the art, items shown separately in FIG. 3 could be combined and some items could be separated. Furthermore, each of the above identified elements in memory 340 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 340 may store a subset of the modules and data structures identified above. Memory 340 also may store additional modules and data structures not described above.

Figure 4:
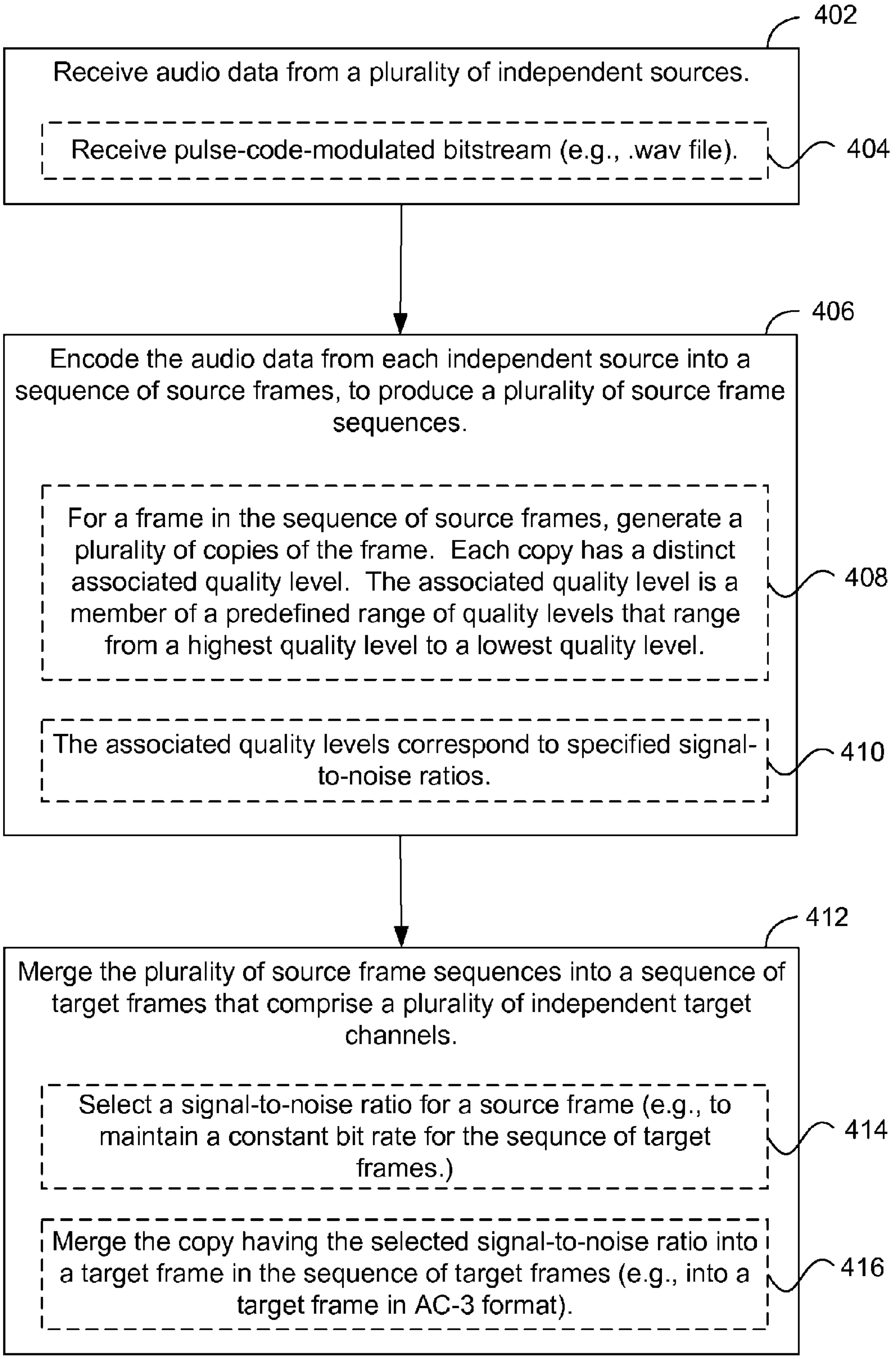
FIG. 4 is a flow diagram illustrating a process for encoding audio in accordance with some embodiments.

FIG. 4 is a flow diagram illustrating a process 400 for encoding audio in accordance with some embodiments. In some embodiments, process 400 is performed by a video game system such as video game system 200 (FIG. 2). Alternately, process 400 is performed in a distinct computer system and the resulting encoded audio data is transferred to or copied to one or more video game systems 200. Audio data is received from a plurality of independent sources (402). In some embodiments, audio data is received from each independent source in the form of a pulse-code-modulated bitstream, such as a .wav file (404). In some embodiments, the audio data received from independent sources include audio data corresponding to background music for a video game and audio data corresponding to various sound effects for a video game.

Audio data from each independent source is encoded into a sequence of source frames, thus producing a plurality of source frame sequences (406). In some embodiments, an audio signal pre-encoder such as audio signal pre-encoder 264 of video game system 200 (FIG. 2) or of a separate computer system encodes the audio data from each independent source. In some embodiments, for a frame in the sequence of source frames, a plurality of copies of the frame is generated (408). Each copy has a distinct associated quality level that is a member of a predefined range of quality levels that range from a highest quality level to a lowest quality level. In some embodiments, the associated quality levels correspond to specified signal-to-noise ratios (410). In some embodiments, the number of bits consumed by each copy decreases with decreasing associated quality level. The resulting plurality of source frame sequences is stored in memory for later use, e.g., during performance of an interactive video game.

During performance of a video game or other interactive program, two or more of the plurality of source frame sequences are merged into a sequence of target frames (412). The target frames comprise a plurality of independent target channels. In some embodiments, an audio frame merger such as audio frame merger 255 of game server module 246 (FIG. 2) merges the two or more source frame sequences. In some embodiments, a signal-to-noise ratio for a source frame is selected (414). For example, a signal-to-noise ratio is selected to maintain a constant bit rate for the sequence of target frames. In some embodiments, the selected signal-to-noise ratio is the highest signal-to-noise ratio at which the constant bit rate can be maintained. In some embodiments, however, the bit rate for the sequence of target frames may change dynamically between frames. In some embodiments, the copy of the source frame having the selected signal-to-noise ratio is merged into a target frame in the sequence of target frames (416). In some embodiments, the target frame is in the AC-3 format.

The sequence of target frames may be transmitted from a server system such as video game system 200 (FIG. 2) to a client system such as set-top box 300 (FIG. 3). STB 300 may assign each target channel to a separate speaker or may down-mix two or more target channels into an audio stream assigned to a speaker, depending on the speaker configuration. Merging the plurality of source frames sequences into a sequence of target frames comprising a plurality of independent target channels thus enables simultaneous playback of multiple independent audio signals.

Figure 5:
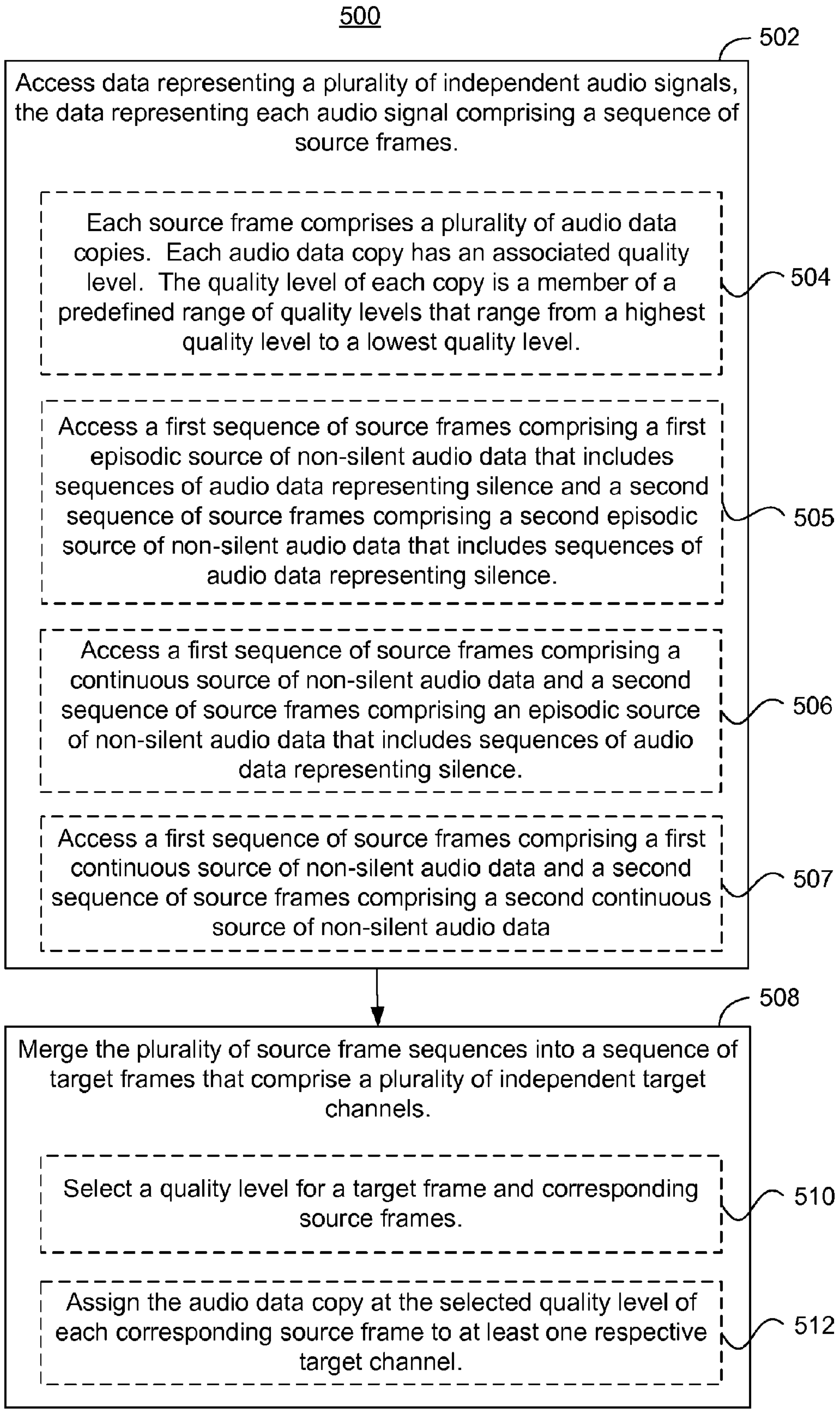
FIG. 5 is a flow diagram illustrating a process for encoding audio in accordance with some embodiments.

FIG. 5 is a flow diagram illustrating a process 500 for encoding audio in accordance with some embodiments. In some embodiments, process 500 is performed by an audio frame merger such as audio frame merger 255 in video game system 200 (FIG. 2). Data representing a plurality of independent audio signals is accessed (502). The data representing each audio signal comprise a sequence of source frames. In some embodiments, the data representing a plurality of independent audio signals is stored as pre-encoded audio signals 257 in bank 256 of video game system 200, from which the audio frame merger 255 can access it. The generation of the pre-encoded audio signals is discussed above with reference to FIG. 4.

In some embodiments, each source frame comprises a plurality of audio data copies (504). Each audio data copy has a distinct associated quality level that is a member of a predefined range of quality levels that range from a highest quality level to a lowest quality level. In some embodiments, the associated quality levels correspond to specified signal-to-noise ratios.

In some embodiments, two sequences of source frames are accessed. For example, a first sequence of source frames comprises a continuous source of non-silent audio data and a second sequence of source frames comprises an episodic source of non-silent audio data that includes sequences of audio data representing silence (506). In some embodiments, the first sequence may correspond to background music for a video game and the second sequence may correspond to a sound effect to be played in response to a user command. In another example, a first sequence of source frames comprises a first episodic source of non-silent audio data and a second sequence of source frames comprises a second episodic source of non-silent audio data; both sequences include sequences of audio data representing silence (505). In some embodiments, the first sequence may correspond to a first sound effect to be played in response to a first user command; the second sequence may correspond to a second sound effect, to be played in response to a second user command, which overlaps with the first sound effect. In yet another example, a first sequence of source frames comprises a first continuous source of non-silent audio data and a second sequence of source frames comprises a second continuous source of non-silent audio data. In some embodiments, the first sequence may correspond to a first musical piece and the second sequence may correspond to a second musical piece to be played in parallel with the first musical piece. In some embodiments, more than two sequences of source frames are accessed.

The plurality of source frame sequences is merged into a sequence of target frames that comprise a plurality of independent target channels (508). In some embodiments, a quality level for a target frame and corresponding source frames is selected (510). For example, a quality level is selected to maintain a constant bit rate for the sequence of target frames. In some embodiments, the selected quality level is the highest quality level at which the constant bit rate can be maintained. In some embodiments, however, the bit rate for the sequence of target frames may change dynamically between frames. In some embodiments, the audio data copy at the selected quality level of each corresponding source frame is assigned to at least one respective target channel (512).

As in process 400 (FIG. 4), the sequence of target frames resulting from process 500 may be transmitted from a server system such as video game system 200 (FIG. 2) to a client system such as set-top box 300 (FIG. 3). STB 300 may assign each target channel to a separate speaker or may down-mix two or more target channels into an audio stream assigned to a speaker, depending on the speaker configuration. Merging the plurality of source frames sequences into a sequence of target frames comprising a plurality of independent target channels thus enables simultaneous playback of multiple independent audio signals.

Figure 6:
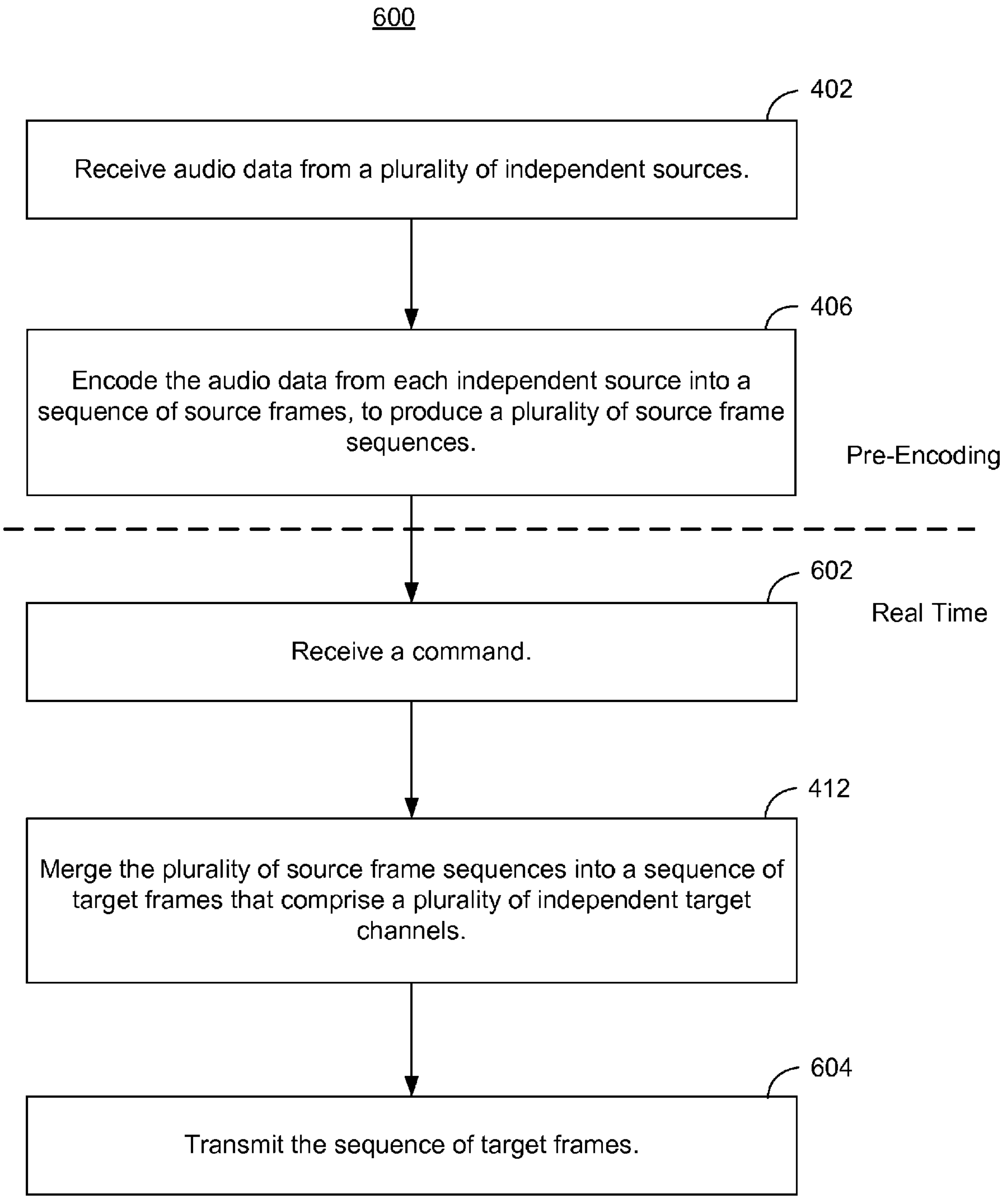
FIG. 6 is a flow diagram illustrating a process for encoding and transmitting audio in accordance with some embodiments.

FIG. 6 is a flow diagram illustrating a process 600 for encoding and transmitting audio in accordance with some embodiments. Audio data is received from a plurality of independent sources (402). Audio data from each independent source is encoded into a sequence of source frames to produce a plurality of source frame sequences (406). Operations 402 and 406, described in more detail above with regard to process 400 (FIG. 4), may be performed in advance, as part of an authoring process. A command is received (602). In some embodiments, video game system 200 receives a command from set top box 300 resulting from an action by a user playing a video game. In response to the command the plurality of source frame sequences is merged into a sequence of target frames that comprise a plurality of independent target channels (412; see FIG. 4). The sequence of target frames is transmitted (604). In some embodiments, the sequence of target frames is transmitted from video game system 200 to STB 300 via network 136. STB 300 may assign each target channel to a separate speaker or may down-mix two or more target channels into an audio stream assigned to a speaker, depending on the speaker configuration. Operations 602, 412, and 604 may be performed in real time, during execution or performance of a video game or other application.

Figure 7:
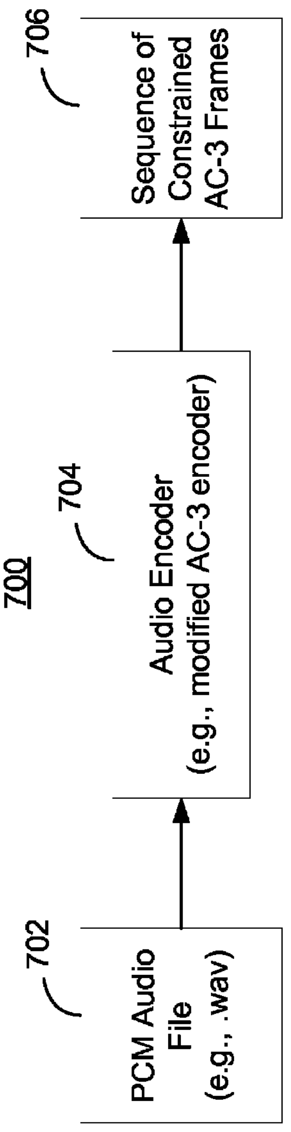
FIG. 7 is a block diagram illustrating a process for encoding audio in accordance with some embodiments.

FIG. 7 is a block diagram illustrating a "pre-encoding" or authoring process 700 for encoding audio in accordance with some embodiments. Audio encoder 704 receives a pulse-code-modulated (PCM) file 702, such as a .wav file, as input and produces a file of constrained AC-3 frames 706 as output. In some embodiments, audio encoder 704 is a modified AC-3 encoder. The output AC-3 frames are constrained to ensure that they subsequently can be assigned to a single channel of a target frame. Specifically, all fractional mantissa groups are complete, thus assuring that no mantissas from separate source channels are stored consecutively in the same target channel. In some embodiments, audio encoder 704 corresponds to audio signal pre-encoder 264 of video game system 200 (FIG. 2) and the sequence of constrained AC-3 frames is stored as pre-encoded audio signals 257. In some embodiments, each constrained AC-3 frame includes a cyclic redundancy check (CRC) value. Repeated application of process 700 to PCM audio files from a plurality of independent sources corresponds to an embodiment of operations 402 and 406 of process 400 (FIG. 4). The resulting constrained AC-3 subsequently may be merged into a sequence of target frames.

Figure 8:
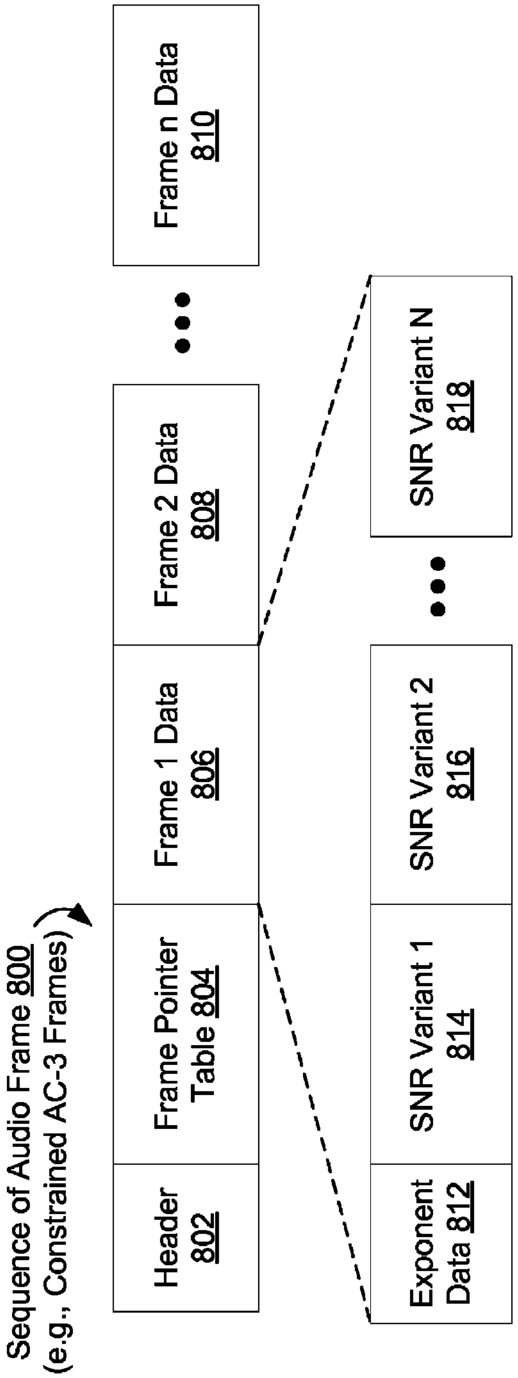
FIG. 8 is a block diagram of an audio frame set in accordance with some embodiments.

FIG. 8 is a block diagram of a sequence of audio frames 800 in accordance with some embodiments. In some embodiments, the sequence of audio frames 800 corresponds to a sequence of constrained AC-3 frames 706 generated by audio encoder 704 (FIG. 7). The sequence of audio frames 800 includes a header 802, a frame pointer table 804, and data for frames 1 through n (806, 808, 810), where n is an integer indicating the number of frames in sequence 800. The header 802 stores general properties of the sequence of audio frames 800, such as version information, bit rate, a unique identification for the sequence, the number of frames, the number of SNR variants per frame, a pointer to the start of the frame data, and a checksum. The frame pointer table 804 includes pointers to each SNR variant of each frame. For example, frame pointer table 804 may contain offsets from the start of the frame data to the data for each SNR variant of each frame and to the exponent data for the frame. Thus, in some embodiments, frame pointer table 804 includes 17 pointers per frame.

Frame 1 data 806 includes exponent data 812 and SNR variants 1 through N (814, 816, 818), where N is an integer indicating the total number of SNR variants per frame. In some embodiments, N equals 16. The data for a frame includes exponent data and mantissa data. In some embodiments, because the exponent data is identical for all SNR variants of a frame, exponent data 812 is stored only once, separately from the mantissa data. Mantissa data varies between SNR variants, however, and therefore is stored separately for each variant. For example, SNR variant N 818 includes mantissa data corresponding to SNR variant N. An SNR variant may be empty if the encoder that attempted to create the variant, such as audio encoder 704 (FIG. 7), was unable to solve the fractional mantissa problem by filling all fractional mantissa groups. Solving the fractional mantissa problem allows the SNR variant to be assigned to a single channel of a target frame. If the encoder is unable to solve the fractional mantissa problem, it will not generate the SNR variant and will mark the SNR variant as empty. In some embodiments in which exponent and mantissa data are stored separately, frame pointer table 804 includes pointers to the exponent data for each frame and to each SNR variant of the mantissa data for each frame.

Figure 9:
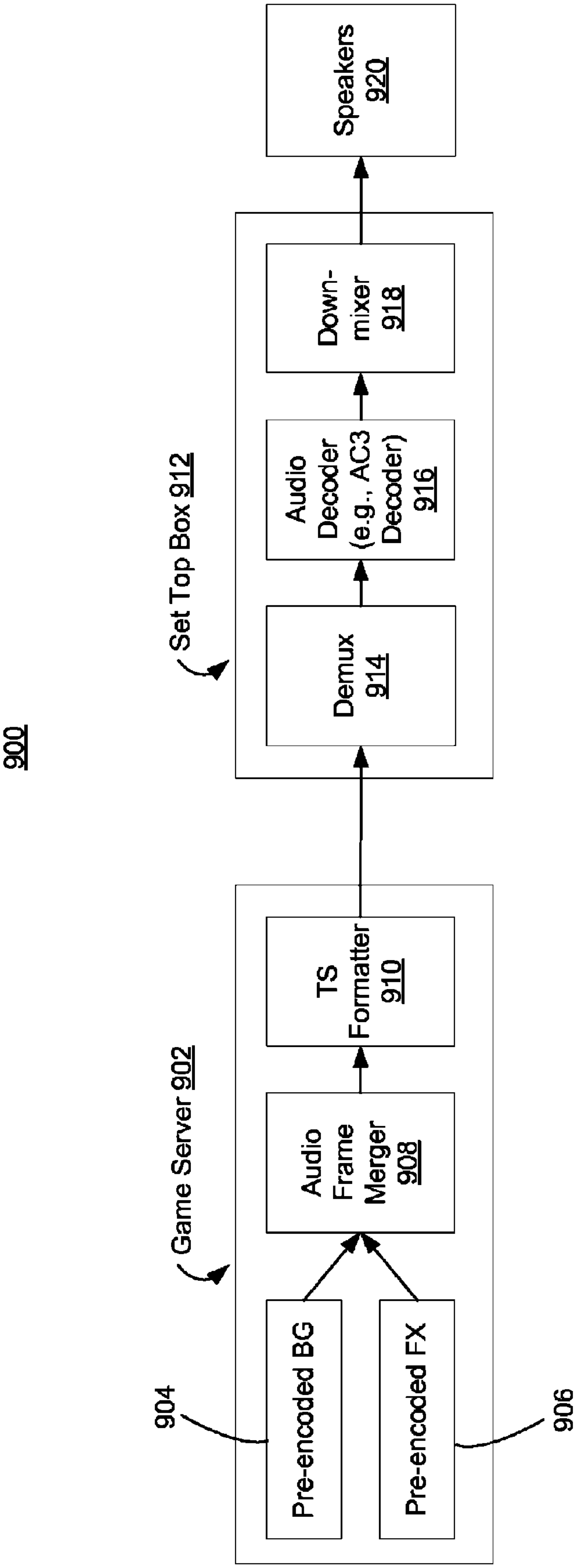
FIG. 9 is a block diagram illustrating a system for encoding, transmitting, and playing audio in accordance with some embodiments.

FIG. 9 is a block diagram illustrating a system 900 for encoding, transmitting, and playing audio in accordance with some embodiments. System 900 includes a game server 902, a set-top box 912, and speakers 920. The game server 902 stores a plurality of independent audio signals including pre-encoded background (BG) music 904 and pre-encoded sound effects (FX) 906. BG data 904 and FX data 906 each comprise a sequence of source frames, such as a sequence of constrained AC-3 frames 706 (FIG. 7). Audio frame merger 908 accesses BG data 904 and FX data 906 and merges the sequences of source frames into target frames. BG data 904 and FX data 906 are assigned to one or more separate channels within the target frames. Transport stream (TS) formatter 910 formats the resulting sequence of target frames for transmission and transmits the sequence of target frames to STB 912. In some embodiments, TS formatter 910 transmits the sequence of target frames to STB 912 over network 136 (FIG. 1).

Set-top box 912 includes demultiplexer (demux) 914, audio decoder 916, and down-mixer 918. Demultiplexer 914 demultiplexes the incoming transport stream, which includes multiple programs, and extracts the program relevant to the STB 912. Demultiplexer 914 then splits up the program into audio (e.g., AC-3) and video (e.g., MPEG-2 video) streams. Audio decoder 916, which in some embodiments is a standard AC-3 decoder, decodes the transmitted audio, including the BG data 904 and the FG data 906. Down-mixer 918 then down-mixes the audio data and transmits audio signals to speakers 920, such that both the FG audio and the BG audio are played simultaneously.

In some embodiments, the function performed by the down-mixer 918 depends on the correlation of the number of speakers 920 to the number of channels in the transmitted target frames. If the speakers 920 include a speaker corresponding to each channel, no down-mixing is performed; instead, the audio signal on each channel is played on the corresponding speaker. If, however, the number of speakers 920 is less than the number of channels, the down-mixer 918 will down-mix channels based on the configuration of speakers 920, the encoding mode used for the transmitted target frames, and the channel assignments made by audio frame merger 908.

The AC-3 audio encoding standard includes a number of different modes with varying channel configurations specified by the Audio Coding Mode ("acmod") property embedded in each AC-3 frame, as summarized in Table 1:

TABLE 1

| acmod | Audio Coding Mode | # Channels | Channel Ordering |
|---|---|---|---|
| '000' | 1 + 1 | 2 | Ch1, Ch2 |
| '001' | 1/0 | 1 | C |
| '010' | 2/0 | 2 | L, R |
| '011' | 3/0 | 3 | L, C, R |
| '100' | 2/1 | 3 | L, R, S |
| '101' | 3/1 | 4 | L, C, R, S |
| '110' | 2/2 | 4 | L, R, SL, SR |
| '111' | 3/2 | 5 | L, C, R, SL, SR |

(Ch1, Ch2: Alternative mono tracks, C: Center, L: Left, R: Right, S: Surround, SL: Left Surround, SR: Right Surround).

In addition to the five channels shown in Table 1, the AC-3 standard includes a low frequency effects (LFE) channel. In some embodiments, the LFE channel is not used, thus gaining additional bits for the other channels. In some embodiments, the AC-3 mode is selected on a frame-by-frame basis. In some embodiments, the same AC-3 mode is used for the entire application. For example, a video game may use the 3/0 mode for each audio frame.

Figure 10A:
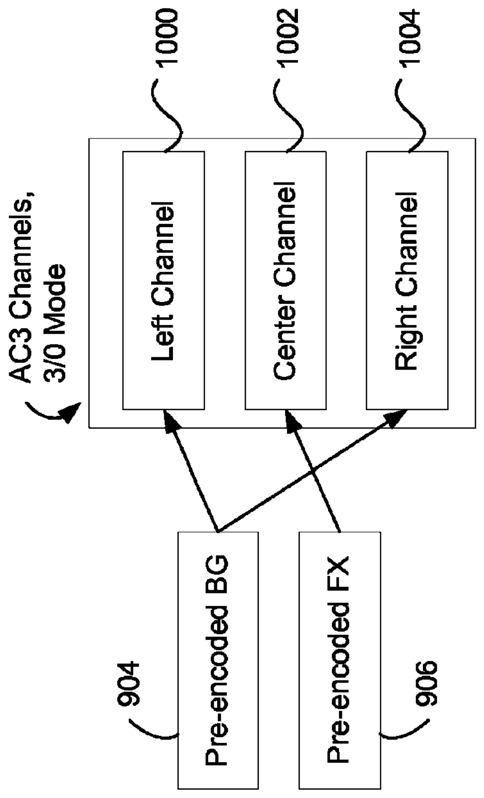
FIGS. 10A-10C are block diagrams illustrating target frame channel assignments of source frames in accordance with some embodiments.
Figure 10B:
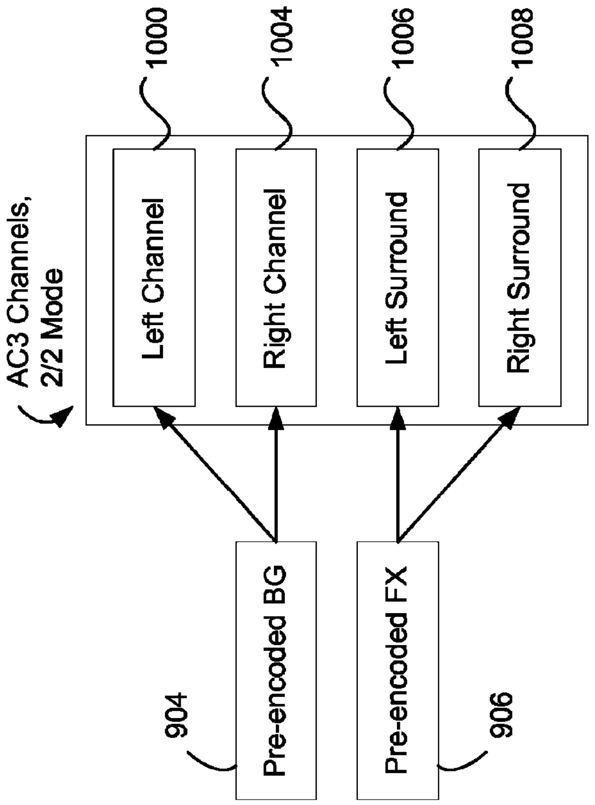
Figure 10C:
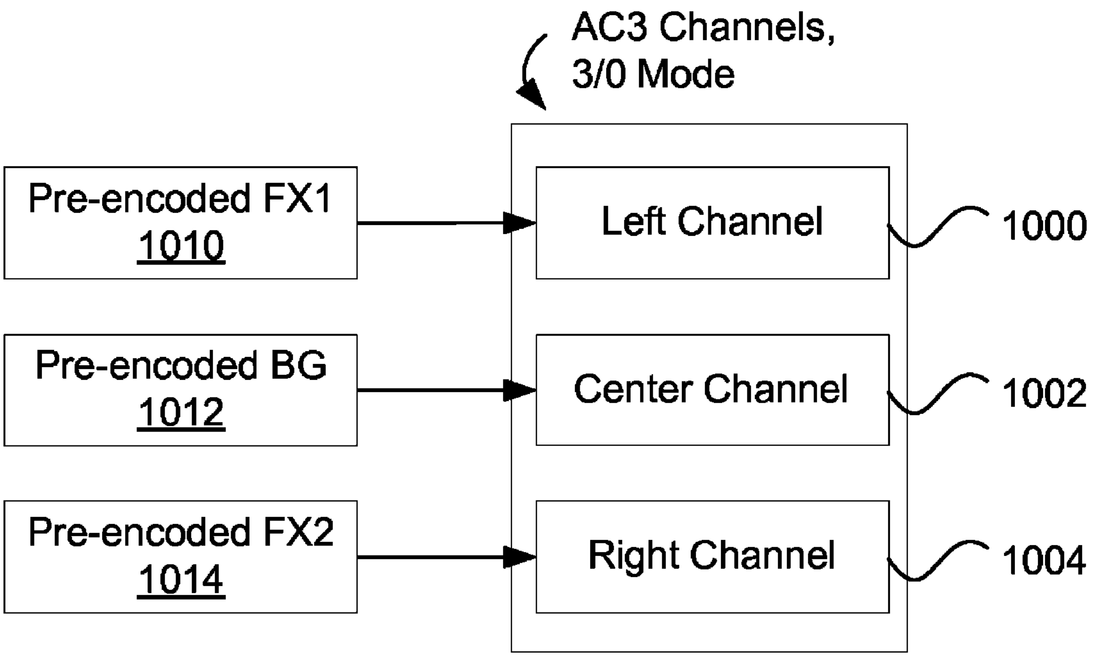

FIGS. 10A-10C are block diagrams illustrating target frame channel assignments of source frames in accordance with some embodiments. The illustrated target frame channel assignments are merely exemplary; other target frame channel assignments are possible. In some embodiments, channel assignments are performed by an audio frame merger such as audio frame mergers 255 (FIG. 2) or 908 (FIG. 9). For FIG. 10A, the 3/0 mode (acmod='011') has been selected. The 3/0 mode has three channels: left 1000, right 1004, and center 1002. Pre-encoded background (BG) music 904 (FIG. 9), which in some embodiments is in stereo and thus comprises two channels, is assigned to left channel 1000 and to right channel 1004. Pre-encoded sound effects (FX) data 906 are assigned to center channel 1002.

For FIG. 10B, the 2/2 mode (acmod='110') has been selected. The 2/2 mode has four channels: left 1000, right 1004, left surround 1006, and right surround 1008. Pre-encoded BG 904 is assigned to left channel 1000 and to right channel 1004. Pre-encoded FX 906 is assigned to left surround channel 1006 and to right surround channel 1008.

For FIG. 10C, the 3/0 mode has been selected. A first source of pre-encoded sound effects data (FX1) 1010 is assigned to left channel 1000 and a second source of pre-encoded sound effects data (FX2) 1014 is assigned to right channel 1004. In some embodiments, pre-encoded BG 1012, which in this example is not in stereo, is assigned to center channel 1002. In some embodiments, pre-encoded BG 1012 is absent and sequences of audio data representing silence are assigned to center channel 1002. In some embodiments, the 2/0 mode may be used when there are only two sound effects and no background sound. The assignment of two independent sound effects to independent channels allows the two sound effects to be played simultaneously on separate speakers, as discussed below with regard to FIG. 14C.

In some embodiments, the audio frame merger that performs channel assignments also can perform audio stitching, thereby providing backward compatibility with video games and other applications that do not make use of mixing source frames. In some embodiments, the audio frame merger is capable of alternating between mixing and stitching on the fly.

Figure 11A:
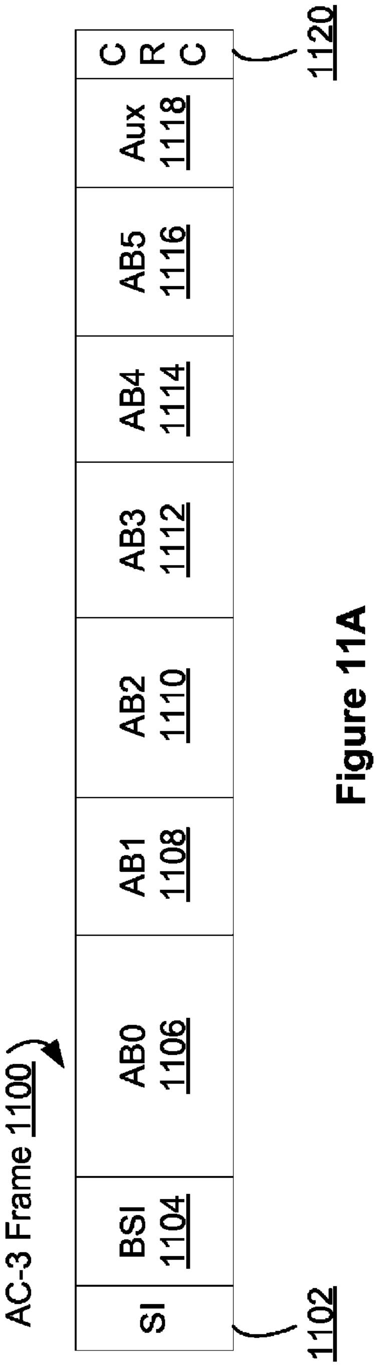
FIGS. 11A & 11B are block diagrams illustrating the data structure of an AC-3 frame in accordance with some embodiments.
Figure 11B:
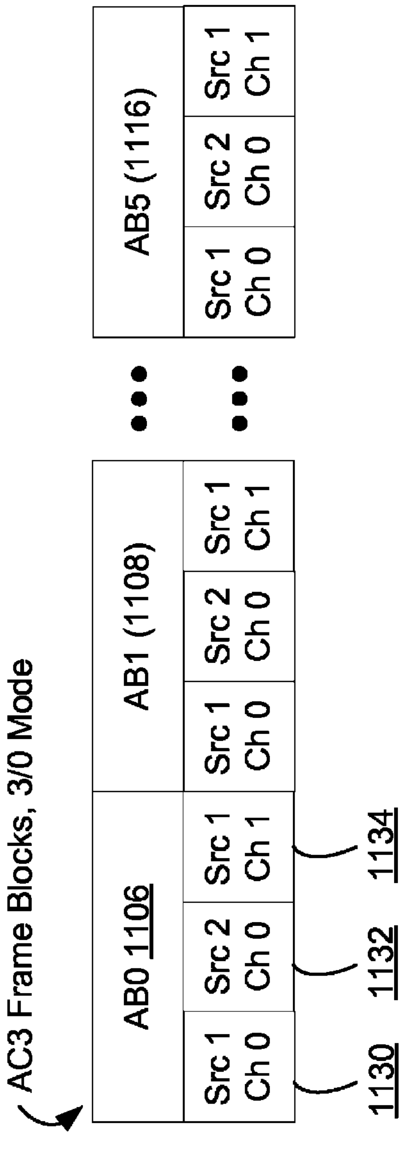

An audio frame merger that performs channel mappings based on the AC-3 standard, such as the channel mappings illustrated in FIGS. 10A & 10B, generates a sequence of AC-3 frames as its output in some embodiments. FIGS. 11A & 11B are block diagrams illustrating the data structure of an AC-3 frame 1100 in accordance with some embodiments. Frame 1100 in FIG. 11A comprises synchronization information (SI) header 1102, bit stream information (BSI) 1104, six coded audio blocks (AB0-AB5) 1106-1116, auxiliary data bits (Aux) 1118, and cyclic redundancy check (CRC) 1120. SI header 1102 includes a synchronization word used to acquire and maintain synchronization, as well as the sample rate, the frame size, and a CRC value whose evaluation by the decoder is optional. BSI 1104 includes parameters describing the coded audio data, such as information about channel configuration, post processing configuration (compression, dialog normalisation, etc.), copyright, and the timecode. Each coded audio block 1106-1116 includes exponent and mantissa data corresponding to 256 audio samples per channel. Auxiliary data bits 1118 include additional data not required for decoding. In some embodiments, there is no auxiliary data. In some embodiments, auxiliary data is used to reserve all bits not used by the audio block data. CRC 1120 includes a CRC over the entire frame. In some embodiments, the CRC value is calculated based on previously calculated CRC values for the source frames. Additional details on AC-3 frames are described in the AC-3 specification (Advanced Television Systems Committee (ATSC) Document A/52B, "Digital Audio Compression Standard (AC-3, E-AC-3) Revision B" (14 Jun. 2005)). The AC-3 specification is hereby incorporated by reference.

The bit allocation algorithm of a standard AC-3 encoder uses all available bits in a frame as available resources for storing bits associated with an individual channel. Therefore, in an AC-3 frame generated by a standard AC-3 encoder there is no exact assignment of mantissa or exponent bits per channel and audio block. Instead, the bit allocation algorithm operates globally on the channels as a whole and flexibly allocates bits across channels, frequencies and blocks. The six blocks are thus variable in size within each frame. Furthermore, some mantissas can be quantized to fractional size and several mantissas are then collected into a group of integer bits that is stored at the location of the first fractional mantissa of the group (see Table 3, below). As a result, mantissas from different channels and blocks may be stored together at a single location. In addition, a standard AC-3 encoder may apply a technique called coupling that exploits dependencies between channels within the source PCM audio to reduce the number of bits required to encode the inter-dependent channels. For the 2/0 mode (i.e., stereo), a standard AC-3 encoder may apply a technique called matrixing to encode surround information. Fractional mantissa quantization, coupling, and matrixing prevent each channel from being independent.

However, when an encoder solves the fractional mantissa problem by filling all fractional mantissa groups, and the encoder does not use coupling and matrixing, an audio frame merger subsequently can assign mantissa and exponent data corresponding to a particular source frame to a specified target channel in an audio block of a target frame. FIG. 11B illustrates channel assignments in AC-3 audio blocks for the 3/0 mode in accordance with some embodiments. Each audio block is divided into left, center, and right channels, such as left channel 1130, center channel 1132, and right channel 1134 of AB0 1106. Data from a first source frame corresponding to a first independent audio signal (Src 1) is assigned to left channel 1130 and to right channel 1134. In some embodiments, data from the first source frame correspond to audio data in stereo format with two corresponding source channels (Src 1, Ch 0 and Src 1, Ch 1). Data corresponding to each source channel in the first source frame is assigned to a separate channel in the AC-3 frame: Src 1, Ch 0 is assigned to left channel 1130 and Src 1, Ch 1 is assigned to right channel 1134. In some embodiments, Src 1 corresponds to pre-encoded BG 904 (FIG. 9). Data from a second source frame corresponding to a second independent audio signal (Src 2) is assigned to center channel 1132. In some embodiments, Src 2 corresponds to pre-encoded FX 906 (FIG. 9).

In some embodiments, the mantissa data assigned to target channels in an AC-3 audio block correspond to a selected SNR variant of the corresponding source frames. In some embodiments, the same SNR variant is selected for each block of a target frame. In some embodiments, different SNR variants may be selected on a block-by-block basis.

Figure 12:
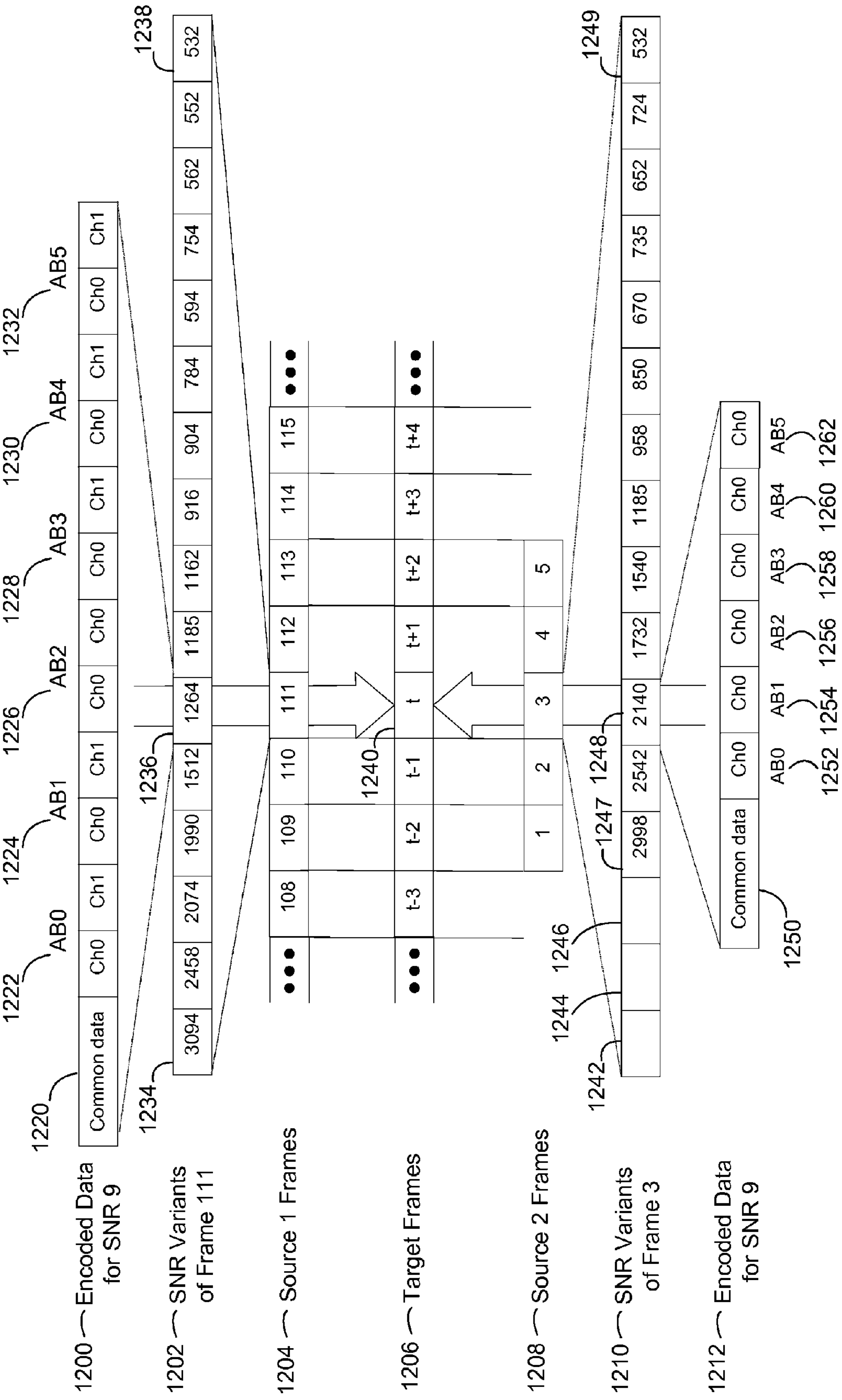
FIG. 12 is a block diagram illustrating the merger of SNR variants of multiple source frames into target frames in accordance with some embodiments.

FIG. 12 is a block diagram illustrating the merger of a selected SNR variant of multiple source frames into target frames in accordance with some embodiments. FIG. 12 includes two sequences of source frames 1204, 1208 corresponding to two independent sources, source 1 (1204) and source 2 (1208). The frames in each sequence are numbered in chronological order and are merged into target frames 1206 such that source 1 frame 111 and source 2 frame 3 are merged into the same target frame (frame t, 1240) and thus will be played simultaneously when the target frame is subsequently decoded.

The relatively low numbering of source 2 frames 1208 compared to source 1 frames 1204 indicates that source 2 corresponds to a much shorter sound effect than source 1. In some embodiments, source 1 corresponds to pre-encoded BG 904 and source 2 corresponds to pre-encoded FX 906 (FIG. 9). Pre-encoded FX 906 may be played only episodically, for example, in response to user commands. In some embodiments, when pre-encoded FX 906 is not being played, a series of bits corresponding to silence is written into the target frame channel to which pre-encoded FX 906 is assigned. In some embodiments, a set-top box such as STB 300 may reconfigure itself if it observes a change in the number of channels in received target frames, resulting in interrupted audio playback. Writing data corresponding to silence into the appropriate target frame channel prevents the STB from observing a change in the number of channels and thus from reconfiguring itself.

Frame 111 of source 1 frame sequence 1204 includes 16 SNR variants, ranging from SNR 0 (1238), which is the lowest quality variant and consumes only 532 bits, to SNR 15 (1234), which is the highest quality variant and consumes 3094 bits. Frame 3 of source 2 frame sequence 1208 includes only 13 SNR variants, ranging from SNR 0 (1249), which is the lowest quality variant and consumes only 532 bits, to SNR 12 (1247), which is the highest quality variant that is available and consumes 2998 bits. The three highest quality potential SNR variants for frame 3 (1242, 1244, & 1246) are not available because they would each consume more bits than the target frame 1206 bit rate and the sample rate would allow. In some embodiments, if the bit size of an SNR variant would be higher than the target frame bit rate and the sample rate allow, audio signal pre-encoder 264 will not create the SNR variant, thus conserving memory. In some embodiments, the target frame bit rate is 128 kB/s and the sample rate is 48 kHz, corresponding to 4096 bits per frame. Approximately 300 of these bits are used for headers and other side information, resulting in approximately 3800 available bits for exponent and mantissa data per frame. The approximately 3800 available bits are also used for delta bit allocation (DBA), discussed below.

In FIG. 12, audio frame merger 255 has selected SNR variants from source 1 (1236) and source 2 (1248) that correspond to SNR 10. These SNR variants are the highest-quality available variants of their respective source frames that when combined do not exceed the allowed number of target bits available for exponent, mantissa and DBA data (1264+2140=3404). Since the number of bits required for these SNR variants is less than the maximum allowable number of bits, bits from the Auxiliary Data Bits field are used to fill up the frame. The source 1 SNR variant 1236 is pre-encoded in constrained AC-3 frame 1200, which includes common data 1220 and audio data blocks AB0-AB5 (1222-1232). In this example, source 1 is in stereo format and therefore is pre-encoded into constrained AC-3 frames that have two channels per audio block (i.e., Ch 0 and Ch 1 in frame 1200). Common data 1220 corresponds to fields SI 1102, BSI 1104, Aux 1118, and CRC 1120 of AC-3 frame 1100 (FIG. 11A). In some embodiments, exponent data is stored separately from mantissa data. For example, constrained AC-3 frame 1200 may include a common exponent data field (not shown) between common data 1220 and AB0 data 1222. Similarly, the source 2 SNR variant 1248 is pre-encoded in constrained AC-3 frame 1212, which includes common data 1250 and audio data blocks AB0-AB5 (1252-1262) and may include common exponent data (not shown). In this example, source 2 is not in stereo and is pre-encoded into constrained AC-3 frames that have one channel per block (i.e., Ch 0 of frame 1212).

Figure 13:
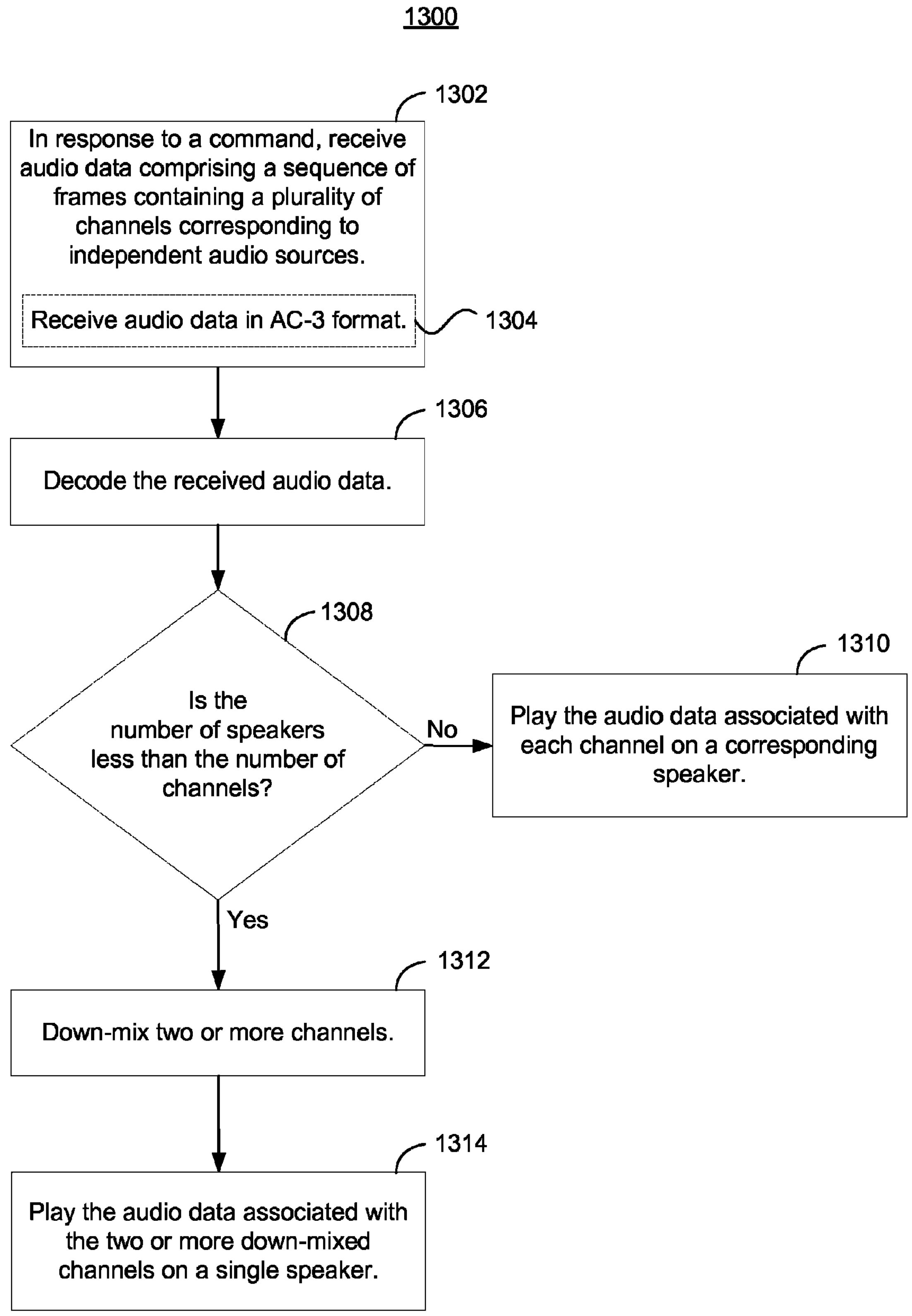
FIG. 13 is a flow diagram illustrating a process for receiving, decoding, and playing a sequence of target frames in accordance with some embodiments.

Once sequences of source frames have been merged into a sequence of target frames, as illustrated in FIG. 12 in accordance with some embodiments, the sequence of target frames can be transmitted to a client system such as set-top box 300 (FIG. 3), where the target frames are decoded and played. FIG. 13 is a flow diagram illustrating a process 1300 for receiving, decoding, and playing a sequence of target frames in accordance with some embodiments. In response to a command, audio data is received comprising a sequence of frames containing a plurality of channels corresponding to independent audio sources (1302). In some embodiments, the audio data is received in AC-3 format (1304). The received audio data is decoded (1306). In some embodiments, a standard AC-3 decoder decodes the received audio data.

The number of speakers associated with the client system is compared to the number of channels in the received sequence of frames (1308). In some embodiments, the number of speakers associated with the client system is equal to the number of speakers coupled to set-top box 300 (FIG. 3). If the number of speakers is greater than or equal to the number of channels (1308—No), the audio data associated with each channel is played on a corresponding speaker (1310). For example, if the received audio data is encoded in the AC-3 2/2 mode, there are four channels: left, right, left surround, and right surround. If the client system has at least four speakers, such that each speaker corresponds to a channel, then data from each channel can be played on the corresponding speaker and no down-mixing is performed. In another example, if the received audio data is encoded in the AC-3 3/0 mode, there are three channels: left, right, and center. If the client system has corresponding left, right, and center speakers, then data from each channel can be played on the corresponding speaker and no down-mixing is performed. If, however, the number of speakers is less than the number of channels (1308—Yes), two or more of the channels are down-mixed (1312) and audio data associated with the two or more down-mixed channels are played on the same speaker (1314).

Figure 14A:
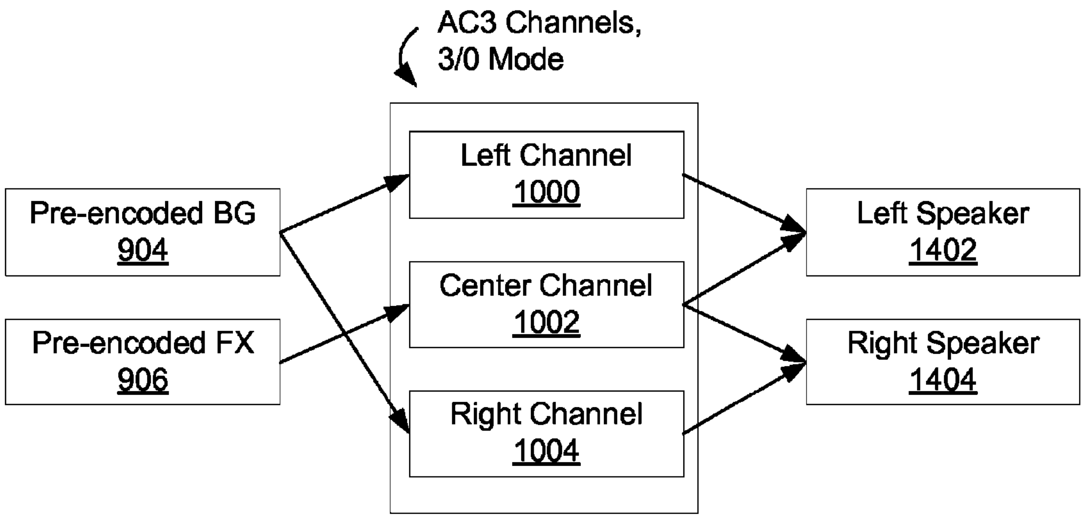
FIGS. 14A-14C are block diagrams illustrating channel assignments and down-mixing in accordance with some embodiments.
Figure 14B:
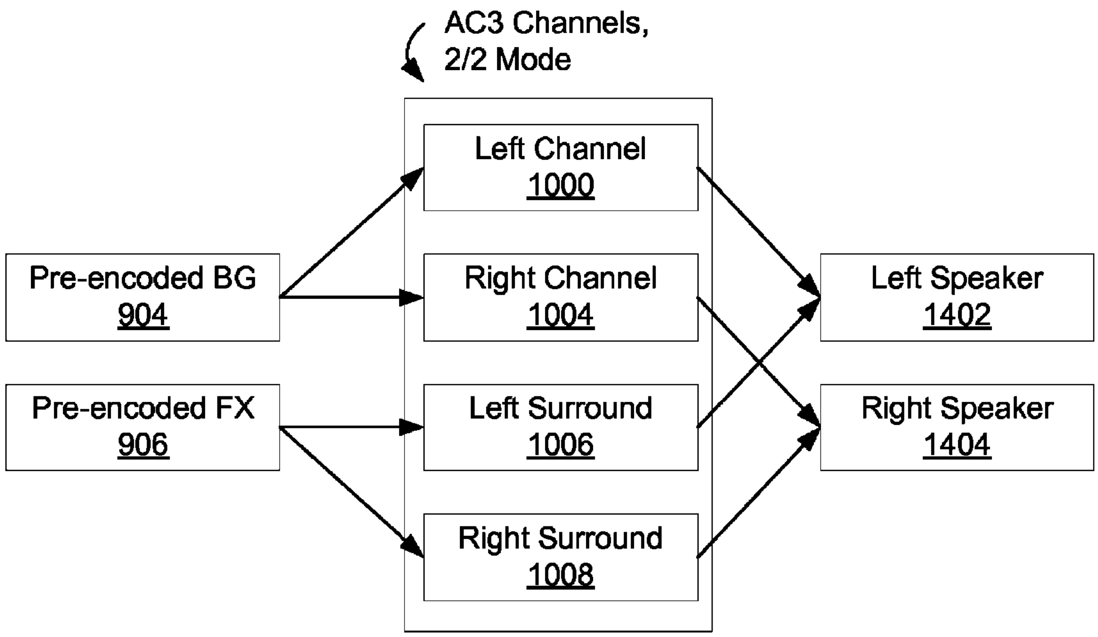
Figure 14C:
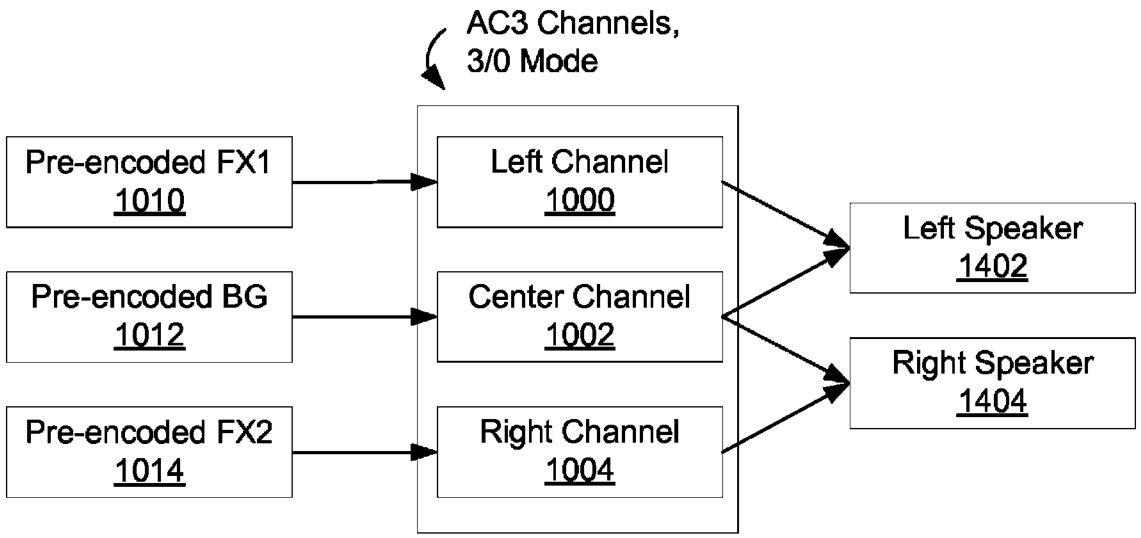

Examples of down-mixing are shown in FIGS. 14A-14C. FIG. 14A is a block diagram illustrating channel assignments and down-mixing for the AC-3 3/0 mode given two source channels 904, 906 and two speakers 1402, 1404, in accordance with some embodiments. Pre-encoded FX 906 is assigned to center channel 1002 and pre-encoded BG 904 is assigned to left channel 1000 and to right channel 1004, as described in FIG. 10A. The audio data on left channel 1000 is played on left speaker 1402 and the audio data on right channel 1004 is played on right speaker 1404. However, no speaker corresponds to center channel 1002. Therefore, the audio data is down-mixed such that pre-encoded FX 906 is played on both speakers simultaneously along with pre-encoded BG 904.

FIG. 14B is a block diagram illustrating channel assignments and down-mixing for the AC-3 2/2 mode given two source channels 904, 906 and two speakers 1402, 1404, in accordance with some embodiments. As described in FIG. 10B, pre-encoded BG 904 is assigned to left channel 1000 and to right channel 1004. Similarly, pre-encoded FX 906 is assigned to left surround channel 1006 and to right surround channel 1008. Because there are four channels and only two speakers, down-mixing is performed. The audio data on left channel 1000 and on left surround channel 1006 are down-mixed and played on left speaker 1402 and the audio data on right channel 1004 and on right surround channel 1008 are down-mixed and played on right speaker 1404. As a result, pre-encoded BG 904 and pre-encoded FX 906 are played simultaneously on both speakers.

FIG. 14C is a block diagram illustrating channel assignments and down-mixing for the AC-3 3/0 mode given three source channels 1010, 1012, and 1014 and two speakers 1402 & 1404, in accordance with some embodiments. As described in FIG. 10C, pre-encoded FX1 1010 is assigned to left channel 1000, pre-encoded FX2 1014 is assigned to right channel 1004, and pre-encoded BG 1012 is assigned to center channel 1002. Because there are three channels and only two speakers, down-mixing is performed. The audio data on left channel 1000 and on center channel 1002 are down-mixed and played on left speaker 1402 and the audio data on right channel 1004 and on center channel 1002 are down-mixed and played on right speaker 1404. As a result, pre-encoded FX1 1010 and pre-encoded FX2 1014 are played simultaneously, each on a separate speaker.

Attention is now directed to solution of the fractional mantissa problem. A standard AC-3 encoder allocates a fractional number of bits per mantissa for some groups of mantissas. If such a group is not completely filled with mantissas from a particular source, mantissas from another source may be added to the group. As a result, a mantissa from one source would be followed immediately by a mantissa from another source. This arrangement would cause an AC-3 decoder to lose track of mantissa channel assignments, thereby preventing the assignment of different source signals to different channels in a target frame.

The AC-3 standard includes a process known as delta bit allocation (DBA) for adjusting the quantization of mantissas within certain frequency bands by modifying the standard masking curve used by encoders. Delta bit allocation information is sent as side-band information to the decoder and is supported by all AC-3 decoders. Using algorithms described below, delta bit allocation can modify bit allocation to ensure full fractional mantissa groups.

In the AC-3 encoding scheme, mantissas are quantized according to a masking curve that is folded with the Power Spectral Density envelope (PSD) formed by the exponents resulting from the 256-bin modified discrete cosine transform (MDCT) of each channel's input samples of each block, resulting in a spectrum of approximately ⅙th octave bands. The masking curve is based on a psycho-acoustic model of the human ear, and its shape is determined by parameters that are sent as side information in the encoded AC-3 bitstream. Details of the bit allocation process for mantissas are found in the AC-3 specification (Advanced Television Systems Committee (ATSC) Document A/52B, "Digital Audio Compression Standard (AC-3, E-AC-3) Revision B" (14 Jun. 2005)).

To determine the level of quantization of mantissas, in accordance with some embodiments, the encoder first determines a bit allocation pointer (BAP) for each of the frequency bands. The BAP is determined based on an address in a bit allocation pointer table (Table 2). The bit allocation pointer table stores, for each address value, an index (i.e., a BAP) into a second table that determines the number of bits to allocate to mantissas. The address value is calculated by subtracting the corresponding mask value from the PSD of each band and right-shifting the result by 5, which corresponds to dividing the result by 32. This value is thresholded to be in the interval from 0 to 63.

TABLE 2

Bit Allocation Pointer Table

| Address | BAP | Address | BAP |
|---|---|---|---|
| 0 | 0 | 32 | 10 |
| 1 | 1 | 33 | 10 |
| 2 | 1 | 34 | 10 |
| 3 | 1 | 35 | 11 |
| 4 | 1 | 36 | 11 |
| 5 | 1 | 37 | 11 |
| 6 | 2 | 38 | 11 |
| 7 | 2 | 39 | 12 |
| 8 | 3 | 40 | 12 |
| 9 | 3 | 41 | 12 |
| 10 | 3 | 42 | 12 |
| 11 | 4 | 43 | 13 |
| 12 | 4 | 44 | 13 |
| 13 | 5 | 45 | 13 |
| 14 | 5 | 46 | 13 |
| 15 | 6 | 47 | 14 |
| 16 | 6 | 48 | 14 |
| 17 | 6 | 49 | 14 |
| 18 | 6 | 50 | 14 |
| 19 | 7 | 51 | 14 |
| 20 | 7 | 52 | 14 |
| 21 | 7 | 53 | 14 |
| 22 | 7 | 54 | 14 |
| 23 | 8 | 55 | 15 |
| 24 | 8 | 56 | 15 |
| 25 | 8 | 57 | 15 |
| 26 | 8 | 58 | 15 |
| 27 | 9 | 59 | 15 |
| 28 | 9 | 60 | 15 |
| 29 | 9 | 61 | 15 |
| 30 | 9 | 62 | 15 |
| 31 | 10 | 63 | 15 |

The second table, which determines the number of bits to allocate to mantissas in the band, is referred to as the Bit Allocation Table. In some embodiments, the Bit Allocation Table includes 16 quantization levels

TABLE 3

Bit Allocation Table: Quantizer Levels and Mantissa Bits vs. BAP

| BAP | Quantizer Levels per Mantissa | Mantissa Bits (# of group bits/ # of mantissas) |
|---|---|---|
| 0 | 0 | 0 |
| **1** | **3** | **1.67 (5/3)** |
| **2** | **5** | **2.33 (7/3)** |
| 3 | 7 | 3 |
| **4** | **11** | **3.5 (7/2)** |
| 5 | 15 | 4 |
| 6 | 32 | 5 |
| 7 | 64 | 6 |

TABLE 3-continued

| Bit Allocation Table: Quantizer Levels and Mantissa Bits vs. BAP | | |
|---|---|---|
| BAP | Quantizer Levels per Mantissa | Mantissa Bits (# of group bits/ # of mantissas) |
| 8 | 128 | 7 |
| 9 | 256 | 8 |
| 10 | 512 | 9 |
| 11 | 1024 | 10 |
| 12 | 2048 | 11 |
| 13 | 4096 | 12 |
| 14 | 16,384 | 14 |
| 15 | 65,536 | 16 |

As can be seen from the above bit allocation table (Table 3), BAPs 1, 2 and 4 refer to quantization levels leading to a fractional size of the quantized mantissa (1.67 (5/3) bits for BAP 1, 2.33 (7/3) bits for BAP 2, and 3.5 (7/2) bits for BAP 4). Such fractional mantissas are collected in three separate groups, one for each of the BAPs 1, 2 and 4. Whenever fractional mantissas are encountered for the first time for each of the three groups, or when fractional mantissas are encountered and previous groups of the same type are completely filled, the encoder reserves the full number of bits for that group at the current location in the output bitstream. The encoder then collects fractional mantissas of that group's type, writing them at that location until the group is full, regardless of the source signal for a particular mantissa. For BAP 1, the group has 5 bits and 3 mantissas are collected until the group is filled. For BAP 2, the group has 7 bits for 3 mantissas. For BAP 4, the group has 7 bits for 2 mantissas.

Delta bit allocation allows the encoder to adjust the quantization of mantissas by modifying the masking curve for selected frequency bands. The AC-3 standard allows masking curve modifications in multiples of +6 or −6 dB per band. Modifying the masking curve by −6 dB for a band corresponds to an increase of exactly 1 bit of resolution for all mantissas within the band, which in turn corresponds to incrementing the address used as an index for the bit allocation pointer table (e.g., Table 2) by +4. Similarly, modifying the masking curve by +6 dB for a band corresponds to a decrease of exactly 1 bit of resolution for all mantissas within the band, which in turn corresponds to incrementing the address used as an index for the bit allocation pointer table (Table 2) by −4.

Delta bit allocation has other limitations. A maximum of eight delta bit correction value entries are allowed per channel and block. Furthermore, the first frequency band in the DBA data is stored as an absolute 5-bit value, while subsequent frequency bands to be corrected are encoded as offsets from the first band number. Therefore, in some embodiments, the first frequency band to be corrected is limited to the range from 0 to 31. In some embodiments, a dummy correction for a band within the range of 0 to 31 is stored if the first actual correction is for a band number greater than 31. Also, because frequency bands above band number 27 have widths greater than one (i.e., there is more than one mantissa per band number), a correction to such a band affects the quantization of several mantissas at once.

Given these rules, delta bit allocation can be used to fill fractional mantissa groups in accordance with some embodiments. In some embodiments, a standard AC-3 encoder is modified so that it does not use delta bit allocation initially: the bit allocation process is run without applying any delta bit allocation. For each channel and block, the data resulting from the bit allocation process is analyzed for the existence of fractional mantissa groups. The modified encoder then tries either to fill or to empty any incomplete fractional mantissa groups by correcting the quantization of selected mantissas using delta bit allocation values. In some embodiments, mantissas in groups corresponding to BAPs 1, 2, and 4 are systematically corrected in turn. In some embodiments, a backtracking algorithm tries all sensible combinations of possible corrections until at least one solution is found.

In the following example (Table 4), the encoder has finished the bit allocation for one block of data for one target frame channel corresponding to a specified source signal at a given SNR. No delta bit allocation has been applied yet and the fractional mantissa groups are not completely filled. Table 4 shows the resulting quantization. For all frequency mantissas that are not quantized to 0, the table lists the band number, the frequency numbers in the band, the bit allocation pointer (BAP; see Table 3) and the address that was used to retrieve the BAP from the BAP table (Table 2):

TABLE 4

| Mantissa Quantization prior to Delta Bit Allocation | | | |
|---|---|---|---|
| Band | Frequency | BAP | Address |
| 0 | 0 | 1 | 4 |
| 1 | 1 | 1 | 4 |
| 2 | 2 | 1 | 4 |
| 3 | 3 | 1 | 4 |
| 8 | 8 | 1 | 1 |
| 9 | 9 | 1 | 4 |
| 10 | 10 | 1 | 4 |
| 11 | 11 | 1 | 4 |
| 12 | 12 | 1 | 4 |
| 13 | 13 | 1 | 4 |
| 14 | 14 | 1 | 2 |
| 15 | 15 | 1 | 3 |
| 17 | 17 | 3 | 10 |
| **18** | **18** | **2** | **6** |
| **19** | **19** | **4** | **11** |
| **20** | **20** | **2** | **7** |
| 22 | 22 | 1 | 3 |
| 23 | 23 | 1 | 1 |
| 24 | 24 | 1 | 2 |
| 25 | 25 | 1 | 2 |
| 27 | 27 | 1 | 2 |
| 28 | 29 | 1 | 1 |
| 28 | 30 | 1 | 1 |
| 30 | 36 | 1 | 2 |
| 32 | 40 | 1 | 2 |
| 33 | 45 | 1 | 3 |
| 34 | 48 | 1 | 3 |
| 35 | 49 | 1 | 3 |
| 42 | 105 | 1 | 1 |

As encoded, without any delta bit allocation corrections, the following number of fractional mantissas exist (in Table 4, mantissas corresponding to BAP 2 and BAP 4 have been highlighted for ease of reference):

TABLE 5

| Fractional Mantissas prior to Delta Bit Allocation | | |
|---|---|---|
| BAP group | Number of mantissas | Current group fill |
| BAP1 (5/3 bits) | 25 | 1 (= 25 mod 3) |
| BAP2 (7/3 bits) | 2 | 2 (= 2 mod 3) |
| BAP4 (7/2 bits) | 1 | 1 (= 1 mod 2) |

As shown in Table 5, for this block, 25 mantissas have a BAP=1, two mantissas have a BAP=2, and one mantissa has a BAP=4. For BAP 1, a full group has three mantissas. Therefore, the 25 mantissas correspond to 8 full groups and a 9th group with only one mantissa (25 mod 3=1). The 9th group needs 2 more mantissas to be full. For BAP 2, a full group has three mantissas. Therefore, the two mantissas corresponds to one group that needs one more mantissa to be full (3−(2 mod 3)=1). For BAP 4, a full group has two mistakes. Therefore, the single mantissa corresponds to one group that needs one more mantissa to be full (2−(1 mod 2)=1).

Several strategies could now be applied to either fill or empty the partially filled mantissa groups. In some embodiments, only delta bit corrections leading to higher number of quantization levels (i.e., leading to increased quality) are permitted. For embodiments with this limitation, the following alternative approaches to filling or emptying the fractional mantissa groups exist.

Figure 15A:
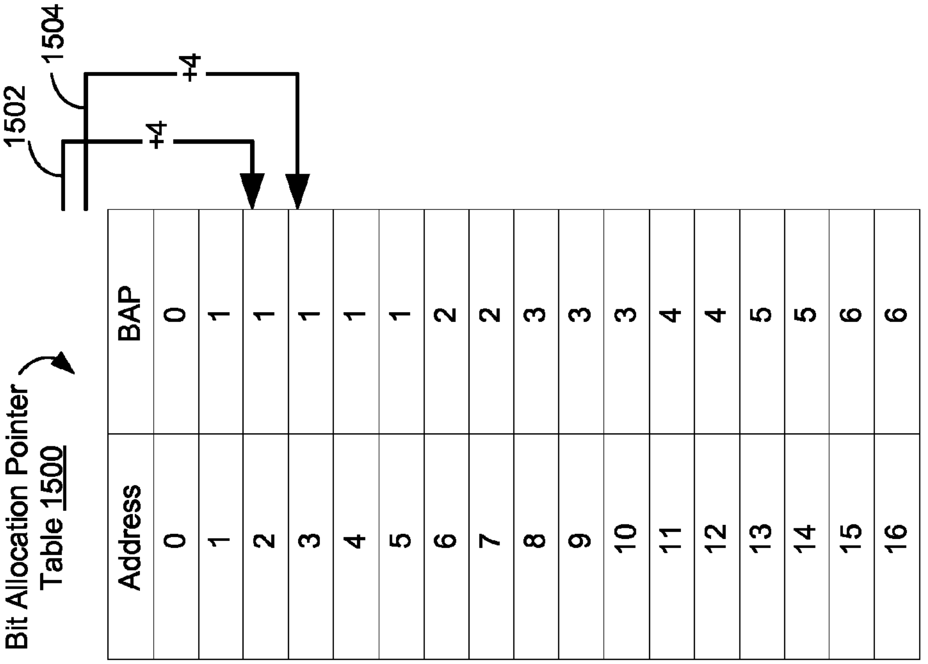
FIGS. 15A-15E illustrate a bit allocation pointer table in accordance with some embodiments.

One alternative is to fill the 9th group with BAP=1 by finding two mantissas with BAP=0 (not shown in Table 4) and trying to increase the mask values by making DBA corrections until each mantissa has a BAP table address corresponding to a BAP value=1. These two mantissas would then fill up the BAP 1 group. FIG. 15A, which illustrates a bit allocation pointer table (BAP table) 1500 in accordance with some embodiments, illustrates this method for filling the 9th group. Arrows 1502 and 1504 correspond to increased mask values for two mantissas with BAP=0 originally. As mentioned above, for embodiments in which DBA is only used to increase quality, one DBA correction step corresponds to an address change of +4. Therefore, this method for filling the 9th group is only possible if there are mantissas in bands for which subtracting the highest possible mask value (which is equal to the predicted mask value plus the maximum number of possible DBA corrections) from the PSD value for such bands results in a BAP table address pointing to a BAP value=1. Many cases have been observed where no such mantissas can be found in a block.

Figure 15B:
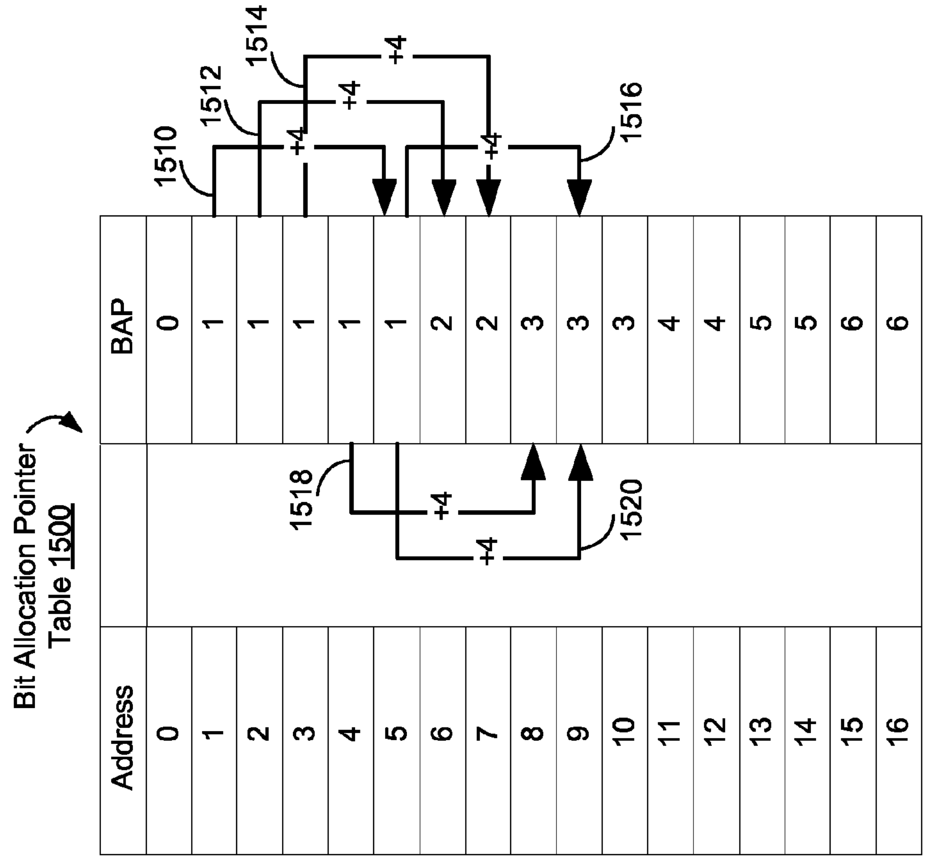

Another alternative is to empty the 9th group with BAP=1 by finding one mantissa with BAP=1 and increasing the address to produce a BAP>1. If the original address is 1, the resulting address after one correction is 5, which still corresponds to BAP=1 (arrow 1510; FIG. 15B). A second correction would result in an address of 9, which corresponds to BAP=3 (arrow 1516; FIG. 15B). In Table 4, these two corrections could be performed for band 8, which has an address of 1.

If the original address is 2 or 3, the address after one correction would be 6 or 7 respectively, which correspond to BAP 2 (arrows 1512 & 1514; FIG. 15B). In Table 4, band 14 has an address of 2 and band 15 has an address of 3. A correction performed for either of these bands would both empty the 9th BAP 1 group and fill the BAP 2 group. In other scenarios, such a correction may create a fractional mantissa group for BAP 2 that in turn would require correction.

If the original address is 4 or 5, the address after one correction would be 8 or 9 respectively, which correspond to BAP 3 (arrows 1518 & 1520; FIG. 15B). In Table 4, band 0 or several other bands with addresses of 4 could be corrected, thereby emptying the 9th BAP 1 group and producing an additional BAP 3 mantissa.

In some embodiments, once all BAP 1 groups are filled, corrections to fill all BAP 2 groups are considered. One alternative, as discussed above, is to find a mantissa in bands with addresses of 2 or 3 and increase the address to 6 or 7, corresponding to BAP 2. In Table 4, band 14 can be corrected from an address of 2 to an address of 6 (arrow 1512; FIG. 15B) and band 15 can be corrected from an address of 3 to an address of 7 (arrow 1514; FIG. 15B). In general, however, corrections from BAP 1 to BAP 2 should not be performed once all BAP 1 groups are filled; otherwise, partially filled BAP 1 groups will be created.

Figure 15C:
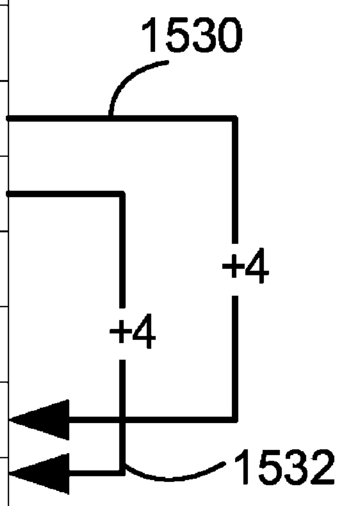

Another alternative is to empty an incomplete BAP 2 group by increasing the addresses of mantissas in the incomplete group. Specifically, addresses 6 and 7 may be corrected to addresses 10 and 11 respectively (arrows 1530 & 1532; FIG. 15C). In Table 4, band 18 can be corrected from address 6 to address 10, corresponding to BAP 3. Band 20 can be corrected from address 7 to address 11, corresponding to BAP 4. A correction to band 20 thus would simultaneously empty the BAP 2 group and fill the BAP 4 group. In other scenarios, a correction from address 7 to address 11 may create a BAP 4 group that in turn would require correction.

Figure 15E:
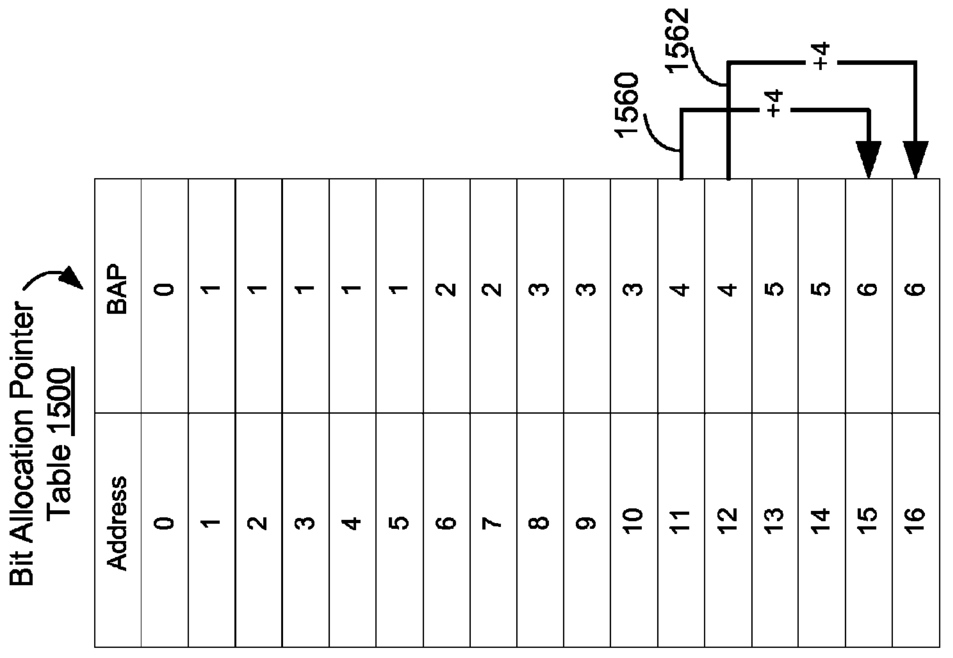
Figure 15D:
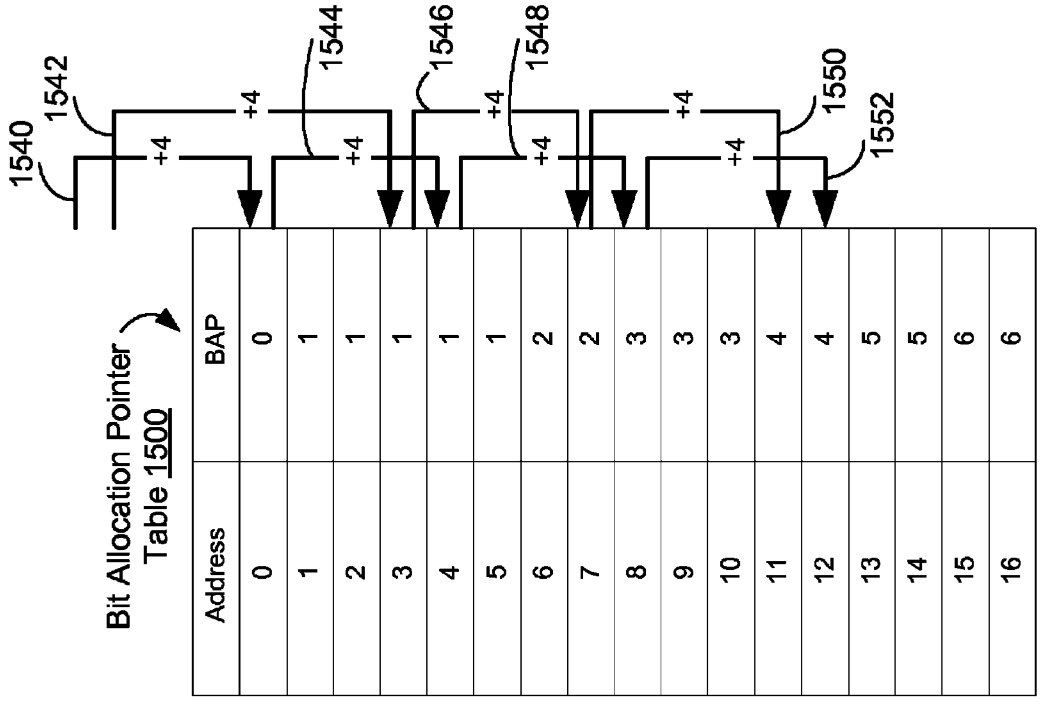

In some embodiments, once all BAP 1 and BAP 2 groups are filled, corrections to fill all BAP 4 groups are considered. One alternative is to try to find a mantissa with an address for which application of DBA corrections leads to an address corresponding to BAP 4. Specifically, addresses 7 or 8 may be corrected to addresses 11 or 12 respectively (arrows 1550 & 1552; FIG. 15D). In table 4, as discussed above, band 20 can be corrected from address 7 to address 11, corresponding to BAP 4. Alternatively, two corrections may be performed to get from address 3 to address 11 (arrows 1546 & 1550) or from address 4 to address 12 (arrows 1548 & 1552). In general, however, once all BAP 1 and BAP 2 groups have been filled, no corrections may be performed that would create partially filled BAP 1 or BAP 2 groups. In some cases it may be possible to move a mantissa with a BAP=0 to addresses 11 or 12 by applying enough corrective steps (arrows 1540, 1544, 1548, & 1552 or arrows 1542, 1546, & 1550). As discussed above, however, this final method is only possible if original, unquantized mantissa values can be found that have mask values high enough that they won't be masked by the highest possible mask value for the band.

Another alternative is to find a mantissa with an address of 11 or 12, corresponding to BAP 4, and to perform a DBA correction to increase the address to 15 or 16, corresponding to BAP 6 (arrows 1560 & 1562; FIG. 15E). In Table 4, band 19 can be corrected from an address of 11 to an address of 19, thus emptying the partially filled BAP 4 group.

The strategies described above for filling or emptying partially filled fractional mantissa groups are further complicated by the fact that for bands 28 and higher, the BAP of more than one mantissa is changed by a single DBA correction. For example, if such a band contained one mantissa with an address leading to a BAP=1 and another with an address resulting in a BAP=2, two fractional mantissa groups would be modified with one corrective value.

In some embodiments, an algorithm applies the above strategies for filling or emptying partially filled mantissa groups sequentially, first processing BAP 1 groups, then BAP 2 groups, and finally BAP 4 groups. Other orderings of BAP group processing are possible. Such an algorithm can find a solution for the fractional mantissa problem for many cases of bit allocations and partial fractional mantissa groups. However, the order in which the processing is performed determines the number of possible solutions. In other words, the algorithm's linear execution limits the solution space.

To enlarge the solution space, a backtracking algorithm is used in accordance with some embodiments. In some embodiments, the backtracking algorithm tries out all sensible combinations of the above strategies. Possible combinations of delta bit allocation corrections are represented by vectors (v1, . . . , vm). The backtracking algorithm recursively traverses the domain of the vectors in a depth first manner until at least one solution is found. In some embodiments, when invoked, the backtracking algorithm starts with an empty vector. At each stage of execution it adds a new value to the vector, thus creating a partial vector. Upon reaching a partial vector ($v_1, \ldots, v_i$) which cannot represent a partial solution, the algorithm backtracks by removing the trailing value from the vector, and then proceeds by trying to extend the vector with alternative values. In some embodiments, the alternative values correspond to DBA strategies described above with regard to Table 4.

The backtracking algorithm's traversal of the solution space can be represented by a depth-traversal of a tree. In some embodiments, the tree itself is not entirely stored by the algorithm in discourse; instead just a path toward a root is stored, to enable the backtracking.

In some embodiments, a backtracking algorithm frequently finds a solution requiring the minimal amount of corrections, although the backtracking algorithm is not guaranteed to result in the minimal amount of corrections. For the example of Table 4, in some embodiments, a backtracking algorithm first corrects band 14 by a single +4 address step, thus reduction BAP 1 by one member and increasing BAP 2 by one member. The backtracking algorithm then corrects band 19 by a single +4 address step, thus reducing BAP 4 by one number. The final result, with all fractional mantissa groups complete, is shown in Table 6. BAP 1 is completely filled with 24 bands (24 mod 3=0), BAP 2 is completely filled with three bands (3 mod 3=0), and BAP 4 is empty.

TABLE 6

Mantissa Quantization after Delta Bit Allocation

| Band | Frequency | BAP | Address |
|---|---|---|---|
| 0 | 0 | 1 | 4 |
| 1 | 1 | 1 | 4 |
| 2 | 2 | 1 | 4 |
| 3 | 3 | 1 | 4 |
| 8 | 8 | 1 | 1 |
| 9 | 9 | 1 | 4 |
| 10 | 10 | 1 | 4 |
| 11 | 11 | 1 | 4 |
| 12 | 12 | 1 | 4 |
| 13 | 13 | 1 | 4 |
| **14** | **14** | **2** | **6** |
| 15 | 15 | 1 | 3 |
| 17 | 17 | 3 | 10 |
| 18 | 18 | 2 | 6 |
| **19** | **19** | **7** | **19** |
| 20 | 20 | 2 | 7 |
| 22 | 22 | 1 | 3 |
| 23 | 23 | 1 | 1 |
| 24 | 24 | 1 | 2 |
| 25 | 25 | 1 | 2 |
| 27 | 27 | 1 | 2 |
| 28 | 29 | 1 | 1 |
| 28 | 30 | 1 | 1 |
| 30 | 36 | 1 | 2 |
| 32 | 40 | 1 | 2 |
| 33 | 45 | 1 | 3 |
| 34 | 48 | 1 | 3 |
| 35 | 49 | 1 | 3 |
| 42 | 105 | 1 | 1 |

In some embodiments, the backtracking algorithm occasionally cannot find a solution for a particular SNR variant of a source frame. The particular SNR variant thus will not be available to the audio frame merger for use in the target frame. In some embodiments, if the audio frame merger selects an SNR variant that is not available, the audio frame merger selects the next lower SNR variant instead, resulting in a slight degradation in quality but assuring continuous sound playback.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of encoding audio, comprising:
at a computer system including one or more processors and memory:
storing data representing a plurality of independent audio signals, the data representing each respective audio signal comprising a respective sequence of source frames of audio data; wherein each source frame in the respective sequence of sources frames comprises a plurality of copies of the audio data of the source frame, each copy of the audio data of the source frame having an associated quality level, the quality level of each copy being a member of a predefined range of quality levels that range from a highest quality level to a lowest quality level;
receiving a user command;
in response to the user command, selecting a first audio signal; and
merging the sequences of source frames for the first audio signal and a second audio signal into a sequence of target frames, wherein:
the target frames comprise a plurality of target channels in the target frames;
the first audio signal comprises an episodic source of non-silent audio data that includes sequences of audio data representing silence;
the second audio signal comprises a continuous source of non-silent audio data; and
the merging includes, for a respective target frame:
selecting a quality level;
selecting a first source frame for the first audio signal at the selected quality level;
selecting a second source frame for the second audio signal at the selected quality level; and
assigning the first source frame and the second source frame to separate respective target channels in the respective target frame.

2. The method of claim 1, wherein a respective copy of the audio data of the first source frame comprises one or more fractional mantissa groups, wherein each fractional mantissa group is full.

3. A method of encoding audio, comprising:
at a computer system including one or more processors and memory:
in advance of execution of an application:
receiving audio data from a plurality of respective independent sources including a first audio signal and a second audio signal, wherein the first audio signal comprises an episodic source of non-silent audio data that includes sequences of audio data representing silence and the second audio signal comprises a continuous source of non-silent audio data; and
encoding the audio data from each respective independent source into a respective sequence of source frames, to produce a plurality of sequences of source frames of audio data, wherein each source frame in each respective sequence of source frames comprises a plurality of copies of the audio data of the source frame, each copy of the audio data in the source frame having a distinct associated quality level, the quality level of each copy being a member of a predefined range of quality levels that range from a highest quality level to a lowest quality level; and during execution of the application:

receiving a command corresponding to an action in the application; and in response to receiving the command, merging the plurality of sequences of source frames into a sequence of target frames, wherein the target frames comprise a plurality of independent target channels in the target frames and each sequence of source frames is uniquely assigned to one or more target channels of the plurality of independent target channels in the target frames.

4. A system for encoding audio, comprising:

memory;

one or more processors;

one or more programs stored in the memory and configured for execution by the one or more processors, the one or more programs including instructions for:

storing data representing a plurality of independent audio signals, the data representing each respective audio signal comprising a respective sequence of source frames of audio data; wherein each source frame in the respective sequence of sources frames comprises a plurality of copies of the audio data of the source frame, each copy of the audio data of the source frame having an associated quality level, the quality level of each copy being a member of a predefined range of quality levels that range from a highest quality level to a lowest quality level;

receiving a user command;

in response to the user command, selecting a first audio signal; and merging the sequences of source frames for the first audio signal and a second audio signal into a sequence of target frames, wherein:

the target frames comprise a plurality of target channels in the target frames;

the first audio signal comprises an episodic source of non-silent audio data that includes sequences of audio data representing silence;

the second audio signal comprises a continuous source of non-silent audio data; and the instructions for merging include, for a respective target frame:

instructions for selecting a quality level;

instructions for selecting a first source frame for the first audio signal at the selected quality level;

instructions for selecting a second source frame for the second audio signal at the selected quality level; and instructions for assigning the first source frame and the second source frame to separate respective target channels in the respective target frame.

5. A system for encoding audio, comprising:

memory;

one or more processors;

one or more programs stored in the memory and configured for execution by the one or more processors, the one or more programs including instructions for:

in advance of execution of an application:

receiving audio data from a plurality of respective independent sources including a first audio signal and a second audio signal, wherein the first audio signal comprises an episodic source of non-silent audio data that includes sequences of audio data representing silence and the second audio signal comprises a continuous source of non-silent audio data;

encoding the audio data from each respective independent source into a respective sequence of source frames, to produce a plurality of sequences of source frames of audio data, wherein each source frame in each respective sequence of source frames comprises a plurality of copies of the audio data of the source frame, each copy of the audio data in the source frame having a distinct associated quality level, the quality level of each copy being a member of a predefined range of quality levels that range from a highest quality level to a lowest quality level; and during execution of the application:

receiving a command corresponding to an action in the application; and in response to receiving the command, merging the plurality of sequences of source frames into a sequence of target frames, wherein the target frames comprise a plurality of independent target channels in the target frames and each sequence of source frames is uniquely assigned to one or more target channels of the plurality of independent target channels in the target frames.

6. A non-transitory computer readable storage medium storing one or more programs, the one or more programs comprising instructions, which when executed by a computer system, cause the computer system to:

store data representing a plurality of independent audio signals, the data representing each respective audio signal comprising a respective sequence of source frames of audio data; wherein each source frame in the respective sequence of sources frames comprises a plurality of copies of the audio data of the source frame, each copy of the audio data of the source frame having an associated quality level, the quality level of each copy being a member of a predefined range of quality levels that range from a highest quality level to a lowest quality level;

receive a user command; and in response to the user command, select a first audio signal; and merge the sequences of source frames for the first audio signal and a second audio signal into a sequence of target frames, wherein:

the target frames comprise a plurality of target channels in the target frames:

the first audio signal comprises an episodic source of non-silent audio data that includes sequences of audio data representing silence;

the second audio signal comprises a continuous source of non-silent audio data; and the instructions for merging include, for a respective target frame:

instructions for selecting a quality level;

instructions for selecting a first source frame for the first audio signal at the selected quality level;

instructions for selecting a second source frame for the second audio signal at the selected quality level; and instructions for assigning the first source frame and the second source frame to separate respective target channels in the respective target frame.

7. A non-transitory computer readable storage medium storing one or more programs, the one or more programs comprising instructions, which when executed by a computer system, cause the computer system to:

in advance of execution of an application:

receive audio data from a plurality of respective independent sources including a first audio signal and a second audio signal, wherein the first audio signal comprises an episodic source of non-silent audio data that includes sequences of audio data representing silence and the second audio signal comprises a continuous source of non-silent audio data;

encode the audio data from each respective independent source into a respective sequence of source frames, to produce a plurality of sequences of source frames of audio data, wherein each source frame in each respective sequence of source frames comprises a plurality of copies of the audio data of the source frame, each copy of the audio data in the source frame having a distinct associated quality level, the quality level of each copy being a member of a predefined range of quality levels that range from a highest quality level to a lowest quality level; and during execution of the application:

receive a command corresponding to an action in the application; and in response to receiving the command, merge the plurality of sequences of source frames into a sequence of target frames, wherein the target frames comprise a plurality of independent target channels in the target frames and each sequence of source frames is uniquely assigned to one or more target channels of the plurality of independent target channels in the target frames.

8. A system for encoding audio, comprising:

means for storing data representing a plurality of independent audio signals, the data representing each respective audio signal comprising a respective sequence of source frames of audio data; wherein each source frame in the respective sequence of sources frames comprises a plurality of copies of the audio data of the source frame, each copy of the audio data of the source frame having an associated quality level, the quality level of each copy being a member of a predefined range of quality levels that range from a highest quality level to a lowest quality level;

means for receiving a user command;

means, responsive to the user command, for selecting a first audio signal; and means for merging the sequences of source frames for the first audio signal and a second audio signal into a sequence of target frames, wherein:

the target frames comprise a plurality of target channels in the target frames the first audio signal comprises an episodic source of non-silent audio data that includes sequences of audio data representing silence;

the second audio signal comprises a continuous source of non-silent audio data; and the merging includes, for a respective target frame:

selecting a quality level;

selecting a first source frame for the first audio signal at the selected quality level;

selecting a second source frame for the second audio signal at the selected quality level; and assigning the first source frame and the second source frame to separate respective target channels in the respective target frame.

9. A system for encoding audio, comprising:

in advance of execution of an application:

means for receiving audio data from a plurality of respective independent sources including a first audio signal and a second audio signal, wherein the first audio signal comprises an episodic source of non-silent audio data that includes sequences of audio data representing silence and the second audio signal comprises a continuous source of non-silent audio data;

means for encoding the audio data from each respective independent source into a respective sequence of source frames, to produce a plurality of sequences of source frames of audio data, wherein each source frame in each respective sequence of source frames comprises a plurality of copies of the audio data of the source frame, each copy of the audio data in the source frame having a distinct associated quality level, the quality level of each copy being a member of a predefined range of quality levels that range from a highest quality level to a lowest quality level; and during execution of the application:

means for receiving a command corresponding to an action in the application; and means, responsive to receiving the command, for merging the plurality of sequences of source frames into a sequence of target frames, wherein the target frames comprise a plurality of independent target channels in the target frames and each sequence of source frames is uniquely assigned to one or more target channels of the plurality of independent target channels in the target frames.

10. The method of claim 1, wherein:

the command corresponds to an action by a user playing a video game; and the first audio signal corresponds to a sound effect to be played in response to the command; and the second audio signal corresponds to background audio for the video game.

11. The method of claim 1, wherein the quality level is selected to maintain a constant bit rate for the sequence of target frames.

12. The system of claim 4, wherein a respective copy of the audio data of the first source frame comprises one or more fractional mantissa groups, wherein each fractional mantissa group is full.

13. The system of claim 4, wherein:

the command corresponds to an action by a user playing a video game; and the first audio signal corresponds to a sound effect to be played in response to the command; and the second audio signal corresponds to background audio for the video game.

14. The system of claim 4, wherein the quality level is selected to maintain a constant bit rate for the sequence of target frames.

15. The non-transitory computer readable storage medium of claim 6, wherein a respective copy of the audio data of the first source frame comprises one or more fractional mantissa groups, wherein each fractional mantissa group is full.

16. The non-transitory computer readable storage medium of claim 6, wherein:

the command corresponds to an action by a user playing a video game; and the first audio signal corresponds to a sound effect to be played in response to the command; and
the second audio signal corresponds to background audio for the video game.

17. The non-transitory computer readable storage medium of claim 6, wherein the quality level is selected to maintain a constant bit rate for the sequence of target frames.

18. The system of claim 5, wherein:
the application is a video game application; and
the command corresponds to an action by a user playing the video game.

19. The system of claim 5, wherein at least one of the sequences of source frames corresponds to a sound effect in the video game.

20. The method of claim 3, wherein encoding the audio data comprises:
for a frame in a respective sequence of sources frames, generating a plurality of copies of the frame, each copy having an associated quality level, the quality level of each copy being a member of a predefined range of quality levels that range from a highest quality level to a lowest quality level.

21. The method of claim 20, wherein encoding the audio data further comprises:
for each copy, performing a bit allocation process; and
if the bit allocation process creates one or more incomplete fractional mantissa groups, modifying results of the bit allocation process to either fill or empty each incomplete fractional mantissa group.

22. The method of claim 21, wherein for a respective copy, if each incomplete fractional mantissa group cannot be either filled or emptied, the respective copy is not included in the frame.

23. The non-transitory computer readable storage medium of claim 7, wherein the instructions to encode the audio data comprise instructions to:
for a frame in a respective sequence of sources frames, generate a plurality of copies of the frame, each copy having an associated quality level, the quality level of each copy being a member of a predefined range of quality levels that range from a highest quality level to a lowest quality level.

24. The non-transitory computer readable storage medium of claim 23, wherein the instructions to encode the audio data further comprise instructions to:
for each copy, perform a bit allocation process; and
if the bit allocation process creates one or more incomplete fractional mantissa groups, modify results of the bit allocation process to either fill or empty each incomplete fractional mantissa group.

25. The non-transitory computer readable storage medium of claim 24, wherein for a respective copy, if each incomplete fractional mantissa group cannot be either filled or emptied, the respective copy is not included in the frame.

26. The system of claim 5, wherein the audio data from a respective independent source is a pulse-code-modulated bitstream.

27. The system of claim 26, wherein the pulse-code-modulated bitstream is a WAV, W64, AU, or AIFF file.

28. The system of claim 5, wherein the instructions for encoding the audio data comprise instructions for:
for a frame in a respective sequence of sources frames, generating a plurality of copies of the frame, each copy having an associated quality level, the quality level of each copy being a member of a predefined range of quality levels that range from a highest quality level to a lowest quality level.

29. The system of claim 28, wherein the instructions for encoding the audio data further comprise instructions for:
for each copy, performing a bit allocation process; and
if the bit allocation process creates one or more incomplete fractional mantissa groups, modifying results of the bit allocation process to either fill or empty each incomplete fractional mantissa group.

30. The system of claim 29, wherein the instructions for performing the bit allocation process comprise instructions for modifying results of the bit allocation process by performing delta bit allocation.

31. The system of claim 30, wherein the delta bit allocation is determined by a backtracking algorithm.

32. The system of claim 29, wherein for a respective copy, if each incomplete fractional mantissa group cannot be either filled or emptied, the respective copy is not included in the frame.

33. The system of claim 28, wherein the associated quality levels correspond to specified signal-to-noise ratios.

34. The system of claim 29, wherein the instructions for merging the plurality of sequences of source frames into the sequence of target frames comprise instructions for:
selecting a signal-to-noise ratio for a source frame; and
merging the copy having the selected signal-to-noise ratio into a target frame in the sequence of target frames.

35. The system of claim 34, wherein the instructions for selecting the signal-to-noise ratio comprise instructions for maintaining a constant bit rate for the sequence of target frames.

36. The system of claim 5, wherein the target frames are in the AC-3 format.

* * * * *